United States Patent [19]
Iitsuka

[11] Patent Number: 5,862,385
[45] Date of Patent: Jan. 19, 1999

[54] COMPILE METHOD FOR REDUCING CACHE CONFLICT

[75] Inventor: Takayoshi Iitsuka, Sagamihara, Japan

[73] Assignee: Hitachi, Ltd., Japan

[21] Appl. No.: 861,187

[22] Filed: May 21, 1997

Related U.S. Application Data

[63] Continuation of Ser. No. 303,007, Sep. 8, 1994.

[30] Foreign Application Priority Data

Sep. 10, 1993 [JP] Japan ................................ 5-250014

[51] Int. Cl.$^6$ .................................................. G06F 9/45
[52] U.S. Cl. ........................... 395/709; 395/707; 395/708
[58] Field of Search .................................. 395/701, 703, 395/704, 705, 706, 707, 708, 709, 445, 460, 461

[56] References Cited

U.S. PATENT DOCUMENTS

| | | | |
|---|---|---|---|
| 5,142,634 | 8/1992 | Fite et al. | 395/375 |
| 5,337,415 | 8/1994 | DeLane et al. | 395/375 |
| 5,442,790 | 8/1995 | Nosenchuck | 395/700 |
| 5,481,751 | 1/1996 | Alpert et al. | 395/800 |
| 5,488,729 | 1/1996 | Vegesna et al. | 395/800 |
| 5,497,499 | 3/1996 | Garg et al. | 395/800 |

OTHER PUBLICATIONS

Jouppi, N., "Improved Direct–Mapped Cache Performance by the Addition of a Small Fully–Associative Cache and Prefetch Buffers", Computer Architecture, 1990 International Symposium, IEEE, pp. 363–373, May 1990.

Gosmann et al, "Code Reorganization for Instruction Caches", System Sciences, 1993 Annual Hawaii Int'l Conference IEEE pp. 214–223, Jan. 1993.

Pyster, A., "Compiler Design and Construction", 1980, pp. 11, Jan. 1990.

Leonard, D, "The Moral Dilemma of Decompilers", Data Based Advisor, v10 n8 p. 38(3), Aug. 1992.

Aho, Alfred V. et al., *Compilers* (©1985, Addison Wesley Publishing Co.), pp. 464–473.

Hennessy, J. et al., *Computer Architecture: A Quantitative Approach* ( ©1990 Morgan Kaufmann Publishers, Inc., Palo Alto, California), pp. 408–425.

Krishnamurthy, Sanjay M., "A Brief Survey of Papers on Scheduling for Pipelined Processors", *ACM SIGPLAN Notices*, vol. 25, No. 7, Jul. 1990, pp. 97–106.

*Primary Examiner*—James P. Trammell
*Assistant Examiner*—Kakali Chaki
*Attorney, Agent, or Firm*—Michaelson & Wallace; Peter L. Michaelson; John C. Pokotylo

[57] ABSTRACT

A compiling method, for use with programs to be executed on a computer with cache memory, which programs would otherwise generate decreased performance due to cache conflicts arising from conflicting cache access(es), for reducing the generation of such cache conflict(s) by reordering the order of memory reference code in the program such that conflicting memory references do not start before the completion of memory accesses to a memory block.

6 Claims, 30 Drawing Sheets

```
         Source Program
   COMMON /BLK1/A,B,C
   REAL A(256,128),B(256,128,3),C(256,128)
   DO 10 J=1,128
3  DO 20 I=1,255
      C(I,J) = A(I,J) * B(I,J,2) + A(I+1,J) * B(I,J,3) + B(I,J,1)
20 CONTINUE
10 CONTINUE
```

FIG. 6 (PRIOR ART)

Object Program 7

| Instruction number (61) | Label (62) | Instruction (63) | Operand (64) | Processing contents (65) |
|---|---|---|---|---|
| 1 | loop: | fload | A(r1,J),fr1 | fr1 = A(I,J) |
| 2 | | fload | B(r1,J,2),fr2 | fr2 = B(I,J,2) |
| 3 | | fmpy | fr1,fr2,fr2 | fr2 = fr1 * fr2 |
| 4 | | fload | A(r1+1,J),fr3 | fr3 = A(I+1,J) |
| 5 | | fload | B(r1,J,3)fr4 | fr4 = B(I,J,3) |
| 6 | | fmpy | fr3,fr4,fr4 | fr4 = fr3 * fr4 |
| 7 | | fadd | fr2,fr4,fr4 | fr4 = fr2 + fr4 |
| 8 | | fload | B(r1,J,1),fr5 | fr5 = B(I,J,1) |
| 9 | | fadd | fr4,fr5,fr5 | fr5 = fr4 + fr5 |
| 10 | | fstore | fr5,C(r1,J) | C(I,J) = fr5 |
| 11 | | addi | r1,#1,r1 | r1 = r1 + 1 |
| 12 | | cmp | r1,#255 | compare r1 and 255 |
| 13 | | ble | loop | if r1 ≦ 255 goto loop |

FIG. 7 (PRIOR ART)

| I value | Instruction number (71) | Referenced array element (72) | Hit status (73) | Accepted block (74) | Rejected block (75) | Cache miss caused by cache conflict (76) |
|---|---|---|---|---|---|---|
| I = 1 | 1  | A(1,J)   | Miss | A(1:4,J)   |            |     |
|       | 2  | B(1,J,2) | Miss | B(1:4,J,2) | A(1:4,J)   |     |
|       | 4  | A(2,J)   | Miss | A(1:4,J)   | B(1:4,J,2) | YES |
|       | 5  | B(1,J,3) | Miss | B(1:4,J,3) |            |     |
|       | 8  | B(1,J,1) | Miss | B(1:4,J,1) | B(1:4,J,3) |     |
|       | 10 | C(1,J)   | Miss | C(1:4,J)   | A(1:4,J)   |     |
| I = 2 | 1  | A(2,J)   | Miss | A(1:4,J)   | C(1:4,J)   | YES |
|       | 2  | B(2,J,2) | Miss | B(1:4,J,2) | A(1:4,J)   | YES |
|       | 4  | A(3,J)   | Miss | A(1:4,J)   | B(1:4,J,2) | YES |
|       | 5  | B(2,J,3) | Miss | B(1:4,J,3) | B(1:4,J,1) | YES |
|       | 8  | B(2,J,1) | Miss | B(1:4,J,1) | B(1:4,J,3) | YES |
|       | 10 | C(2,J)   | Miss | C(1:4,J)   | A(1:4,J)   | YES |
| I = 3 | 1  | A(3,J)   | Miss | A(1:4,J)   | C(1:4,J)   | YES |
|       | 2  | B(3,J,2) | Miss | B(1:4,J,2) | A(1:4,J)   | YES |
|       | 4  | A(4,J)   | Miss | A(1:4,J)   | B(1:4,J,2) | YES |
|       | 5  | B(3,J,3) | Miss | B(1:4,J,3) | B(1:4,J,1) | YES |
|       | 8  | B(3,J,1) | Miss | B(1:4,J,1) | B(1:4,J,3) | YES |
|       | 10 | C(3,J)   | Miss | C(1:4,J)   | A(1:4,J)   | YES |
| I = 4 | 1  | A(4,J)   | Miss | A(1:4,J)   | C(1:4,J)   | YES |
|       | 2  | B(4,J,2) | Miss | B(1:4,J,2) | A(1:4,J)   | YES |
|       | 4  | A(5,J)   | Miss | A(5:8,J)   |            |     |
|       | 5  | B(4,J,3) | Miss | B(1:4,J,3) | B(1:4,J,1) | YES |
|       | 8  | B(4,J,1) | Miss | B(1:4,J,1) | B(1:4,J,3) | YES |
|       | 10 | C(4,J)   | Miss | C(1:4,J)   | A(1:4,J)   | YES |

FIG. 9A    Cache Reference Group Analysis 32

FIG. 13 Reordering of Memory References

FIG. 14    Loop Unrolling Method Determination

Cache Conflict Reduction Through Reordering of Intermediate Code

Intermediate Code 5:

| Statement number 305 | Label 310 | Three address statement 320 | Reference group number 330 |
|---|---|---|---|
| 1 | loop: | T1 = A(I,J) | |
| 2 | | T2 = B(I,J,2) | |
| 3 | | T3 = T1 * T2 | |
| 4 | | T4 = A(I+1,J) | |
| 5 | | T5 = B(I,J,3) | |
| 6 | | T6 = T4 * T5 | |
| 7 | | T7 = T3 + T6 | |
| 8 | | T8 = B(I,J,1) | |
| 9 | | T9 = T7 +T8 | |
| 10 | | C(I,J) = T9 | |
| 11 | | I = I + 1 | |
| 12 | | if I ≦ 255 goto loop | |

FIG. 19

Intermediate Code

| 305 | 310 | 320 | 330 |
|---|---|---|---|
| 1 | loop: | T1 = A(I,J) | 1 |
| 2 | | T2 = B(I,J,2) | 2 |
| 3 | | T3 = T1 * T2 | |
| 4 | | T4 = A(I+1,J) | 1 |
| 5 | | T5 = B(I,J,3) | 3 |
| 6 | | T6 = T4 * T5 | |
| 7 | | T7 = T3 + T6 | |
| 8 | | T8 = B(I,J,1) | 4 |
| 9 | | T9 = T7 + T8 | |
| 10 | | C(I,J) = T9 | 5 |
| 11 | | I = I + 1 | |
| 12 | | if I ≤ 255 goto loop | |

FIG. 22A

Loop Unrolling Candidate Table

| 82 Cache Reference Group Number | 84 Unrolling Loop Candidate | 86 Loop Unrolling Count Candidate |
|---|---|---|
| | | |
| ⋮ | ⋮ | ⋮ |

FIG. 22B

Loop Unrolling Candidate Table

| 82 | 84 | 86 |
|---|---|---|
| 1 | DO 20 I=1,255 | 3 |
| 2 | DO 20 I=1,255 | 4 |
| 3 | DO 20 I=1,255 | 4 |
| 4 | DO 20 I=1,255 | 4 |
| 5 | DO 20 I=1,255 | 4 |

FIG. 20A

Intermediate Code

| 305 | 310 | 320 | 330 |
|---|---|---|---|
| 1 | loop: | T1 = A(I,J) | 1 |
| 2 | | T2 = B(I,J,2) | 2 |
| 3 | | T3 = T1 * T2 | |
| 4 | | T4 = A(I+1,J) | 1 |
| 5 | | T5 = B(I,J,3) | 3 |
| 6 | | T6 = T4 * T5 | |
| 7 | | T7 = T3 + T6 | |
| 8 | | T8 = B(I,J,1) | 4 |
| 9 | | T9 = T7 +T8 | |
| 10 | | C(I,J) = T9 | 5 |
| 11 | | T11 = A(I+1,J) | 1 |
| 12 | | T12 = B(I+1,J,2) | 2 |
| 13 | | T13 = T11 * T12 | |
| 14 | | T14 = A(I+2,J) | 1 |
| 15 | | T15 = B(I+1,J,3) | 3 |
| 16 | | T16 = T14 * T15 | |
| 17 | | T17 = T13 + T16 | |
| 18 | | T18 = B(I+1,J,1) | 4 |
| 19 | | T19 = T17 + T18 | |
| 20 | | C(I+1,J) = T19 | 5 |
| 21 | | T21 = A(I+2,J) | 1 |
| 22 | | T22 = B(I+2,J,2) | 2 |
| 23 | | T23 = T21 * T22 | |
| 24 | | T24 = A(I+3,J) | 1 |

FIG. 20B  Intermediate Code

| 305 | 310 | 320 | 330 |
|---|---|---|---|
| 25 |  | T25 = B(I+2,J,3) | 3 |
| 26 |  | T26 = T24 * T25 |  |
| 27 |  | T27 = T23 + T26 |  |
| 28 |  | T28 = B(I+2,J,1) | 4 |
| 29 |  | T29 = T27 + T28 |  |
| 30 |  | C(I+2,J) = T29 | 5 |
| 31 |  | T31 = A(I+3,J) | 1 |
| 32 |  | T32 = B(I+3,J,2) | 2 |
| 33 |  | T33 = T31 * T32 |  |
| 34 |  | T34 = A(I+4,J) | 1 |
| 35 |  | T35 = B(I+3,J,3) | 3 |
| 36 |  | T36 = T34 * T35 |  |
| 37 |  | T37 = T33 + T36 |  |
| 38 |  | T38 = B(I+3,J,1) | 4 |
| 39 |  | T39 = T37 + T38 |  |
| 40 |  | C(I+3,J) = T39 | 5 |
| 41 |  | I = I + 4 |  |
| 42 |  | if I ≤ 252 goto loop |  |

FIG. 21A  Intermediate Code

| 305 | 310 | 320 | 330 |
|---|---|---|---|
| 1 | loop: | T1 = A(I,J) | 1 |
| 2 | | T2 = B(I,J,2) | 2 |
| 3 | | T3 = T1 * T2 | |
| 4 | | T4 = A(I+1,J) | 1 |
| 5 | | T5 = B(I,J,3) | 3 |
| 6 | | T6 = T4 * T5 | |
| 7 | | T7 = T3 + T6 | |
| 8 | | T8 = B(I,J,1) | 4 |
| 9 | | T9 = T7 +T8 | |
| 10 | | C(I,J) = T9 | 5 |
| 11 | | T12 = B(I+1,J,2) | 2 |
| 12 | | T13 = T4 * T12 | |
| 13 | | T14 = A(I+2,J) | 1 |
| 14 | | T15 = B(I+1,J,3) | 3 |
| 15 | | T16 = T14 * T15 | |
| 16 | | T17 = T13 + T16 | |
| 17 | | T18 = B(I+1,J,1) | 4 |
| 18 | | T19 = T17 + T18 | |
| 19 | | C(I+1,J) = T19 | 5 |
| 20 | | T22 = B(I+2,J,2) | 2 |
| 21 | | T23 = T14 * T22 | |
| 22 | | T24 = A(I+3,J) | 1 |
| 23 | | T25 = B(I+2,J,3) | 3 |
| 24 | | T26 = T24 * T25 | |

FIG. 21

FIG. 21B     Intermediate Code
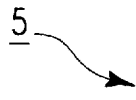
| 305 | 310 | 320 | 330 |
|---|---|---|---|
| 25 |  | T27 = T23 + T26 |  |
| 26 |  | T28 = B(I+2,J,1) | 4 |
| 27 |  | T29 = T27 + T28 |  |
| 28 |  | C(I+2,J) = T29 | 5 |
| 29 |  | T32 = B(I+3,J,2) |  |
| 30 |  | T33 = T24 *T32 | 2 |
| 31 |  | T34 = A(I+4,J) | 1 |
| 32 |  | T35 = B(I+3,J,3) | 3 |
| 33 |  | T36 = T34 * T35 |  |
| 34 |  | T37 = T33 + T36 |  |
| 35 |  | T38 = B(I+3,J,1) | 4 |
| 36 |  | T39 = T37 + T38 |  |
| 37 |  | C(I+3,J) = T39 | 5 |
| 38 |  | I = I + 4 |  |
| 39 |  | if I≦252 goto loop |  |

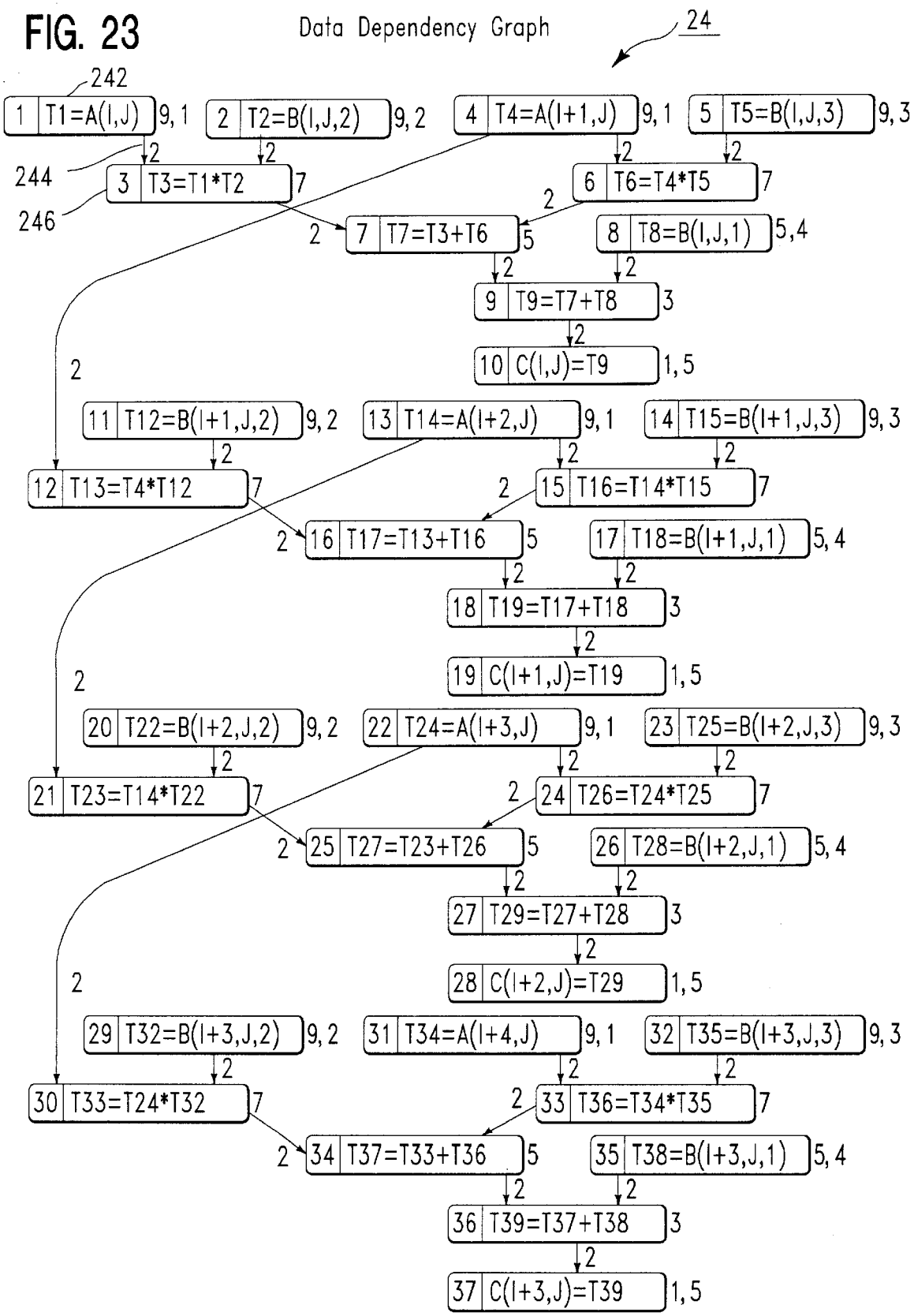
FIG. 23   Data Dependency Graph

FIG. 24A

Schedule Table

| Time Slot Value (303) | Statement Number (305) | Three Address Statement (320) | Reference Group Number (330) |
|---|---|---|---|
| 1 | 1 | T1 = A(I,J) | 1 |
| 2 | 4 | T4 = A(I+1,J) | 1 |
| 3 | 5 | T5 = B(I,J,3) | 3 |
| 4 | 13 | T14 = A(I+2,J) | 1 |
| 5 | 14 | T15 = B(I+1,J,3) | 3 |
| 6 | 22 | T24 = A(I+3,J) | 1 |
| 7 | 23 | T25 = B(I+2,J,3) | 3 |
| 8 | 31 | T34 = A(I+4,J) | 1 |
| 9 | 32 | T35 = B(I+3,J,3) | 3 |
| 10 | 2 | T2 = B(I,J,2) | 2 |
| 11 | 11 | T12 = B(I+1,J,2) | 2 |
| 12 | 20 | T22 = B(I+2,J,2) | 2 |
| 13 | 29 | T32 = B(I+3,J,2) | 2 |
| 14 | 3 | T3 = T1 * T2 | |
| 15 | 6 | T6 = T4 * T5 | |
| 16 | 12 | T13 = T4 * T12 | |
| 17 | 15 | T16 = T14 * T15 | |
| 18 | 21 | T23 = T14 * T22 | |
| 19 | 24 | T26 = T24 * T25 | |
| 20 | 30 | T33 = T24 * T32 | |
| 21 | 33 | T36 = T34 * T35 | |
| 22 | 7 | T7 = T3 + T6 | |
| 23 | 8 | T8 = B(I,J,1) | 4 |
| 24 | 16 | T17 = T13 + T16 | |

FIG. 24

| FIG. 24A |
|---|
| FIG. 24B |

FIG. 24B

Schedule Table

| 303 | 305 | 320 | 330 |
|---|---|---|---|
| 25 | 17 | T18 = B(I+1,J,1) | 4 |
| 26 | 25 | T27 = T23 + T26 | |
| 27 | 26 | T28 = B(I+2,J,1) | 4 |
| 28 | 34 | T37 = T33 + T36 | |
| 29 | 35 | T38 = B(I+3,J,1) | 4 |
| 30 | 9 | T9 = T7 + T8 | |
| 31 | 18 | T19 = T17 + T18 | |
| 32 | 27 | T29 = T27 + T28 | |
| 33 | 36 | T39 = T37 + T38 | |
| 34 | 10 | C(I,J) = T9 | 5 |
| 35 | 19 | C(I+1,J) = T19 | 5 |
| 36 | 28 | C(I+2,J) = T29 | 5 |
| 37 | 37 | C(I+3,J) = T39 | 5 |
| 38 | 38 | I = I + 4 | |
| 39 | 39 | if I ≦ 252 goto loop | |

26

FIG. 25A   Intermediate Code

| 303 | 310 | 320 | 330 |
|---|---|---|---|
| 1 | loop: | T1 = A(I,J) | 1 |
| 2 |  | T4 = A(I+1,J) | 1 |
| 3 |  | T5 = B(I,J,3) | 3 |
| 4 |  | T14 = A(I+2,J) | 1 |
| 5 |  | T15 = B(I+1,J,3) | 3 |
| 6 |  | T24 = A(I+3,J) | 1 |
| 7 |  | T25 = B(I+2,J,3) | 3 |
| 8 |  | T34 = A(I+4,J) | 1 |
| 9 |  | T35 = B(I+3,J,3) | 3 |
| 10 |  | T2 = B(I,J,2) | 2 |
| 11 |  | T12 = B(I+1,J,2) | 2 |
| 12 |  | T22 = B(I+2,J,2) | 2 |
| 13 |  | T32 = B(I+3,J,2) | 2 |
| 14 |  | T3 = T1 * T2 |  |
| 15 |  | T6 = T4 * T5 |  |
| 16 |  | T13 = T4 * T12 |  |
| 17 |  | T16 = T14 * T15 |  |
| 18 |  | T23 = T14 * T22 |  |
| 19 |  | T26 = T24 * T25 |  |
| 20 |  | T33 = T24 * T32 |  |
| 21 |  | T36 = T34 * T35 |  |
| 22 |  | T7 = T3 + T6 |  |
| 23 |  | T8 = B(I,J,1) | 4 |
| 24 |  | T17 = T13 + T16 |  |

FIG. 25B  Intermediate Code
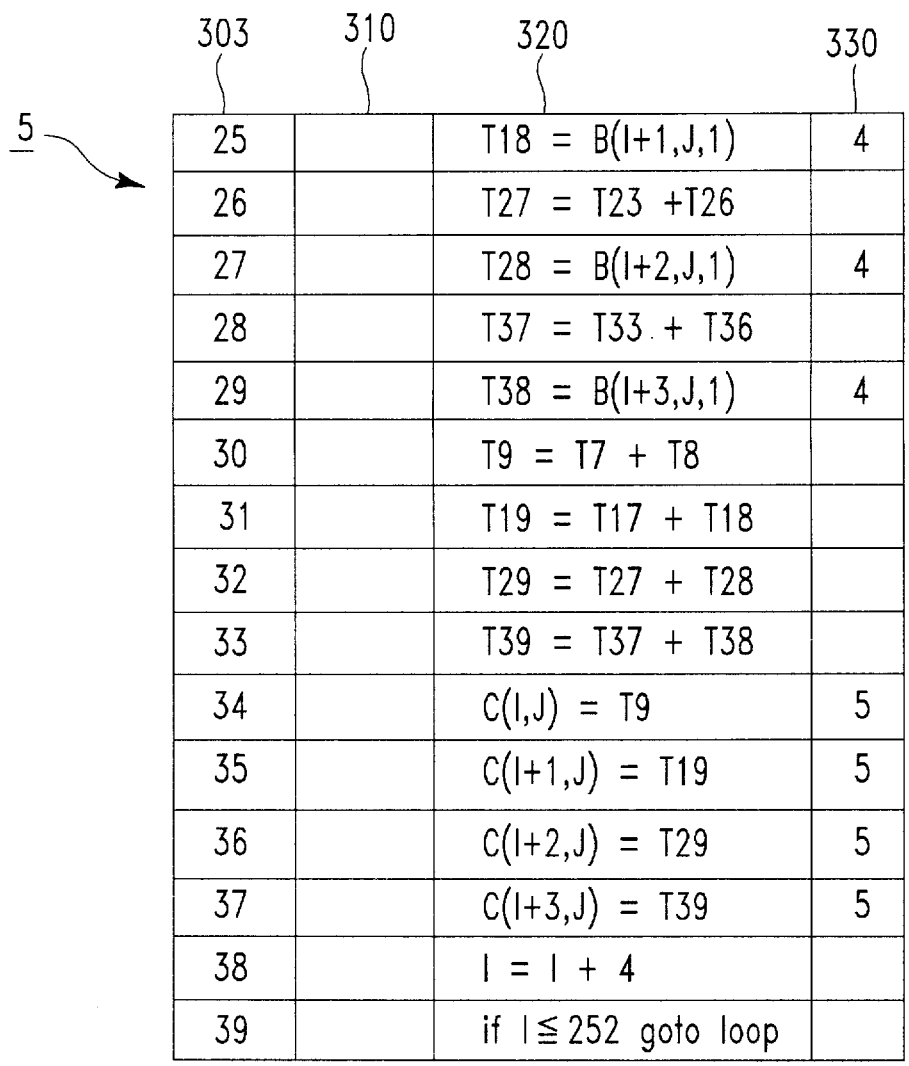
| 303 | 310 | 320 | 330 |
|---|---|---|---|
| 25 | | T18 = B(I+1,J,1) | 4 |
| 26 | | T27 = T23 +T26 | |
| 27 | | T28 = B(I+2,J,1) | 4 |
| 28 | | T37 = T33 + T36 | |
| 29 | | T38 = B(I+3,J,1) | 4 |
| 30 | | T9 = T7 + T8 | |
| 31 | | T19 = T17 + T18 | |
| 32 | | T29 = T27 + T28 | |
| 33 | | T39 = T37 + T38 | |
| 34 | | C(I,J) = T9 | 5 |
| 35 | | C(I+1,J) = T19 | 5 |
| 36 | | C(I+2,J) = T29 | 5 |
| 37 | | C(I+3,J) = T39 | 5 |
| 38 | | I = I + 4 | |
| 39 | | if I ≦ 252 goto loop | |

FIG. 26A

Object Program

| Instruction Number (61) | Label (62) | Instruction (63) | Operand (64) |
|---|---|---|---|
| 1 | loop: | fload | A(r1,J),fr1 |
| 2 | | fload | A(r1+1,J)fr2 |
| 3 | | fload | B(r1,J,3),fr3 |
| 4 | | fload | A(r1+2,J),fr4 |
| 5 | | fload | B(r1+1,J,3),fr5 |
| 6 | | fload | A(r1+3,J),fr6 |
| 7 | | fload | B(r1+2,J,3),fr7 |
| 8 | | fload | A(r1+4,J),fr8 |
| 9 | | fload | B(r1+3,J,3),fr9 |
| 10 | | fload | B(r1,J,2),fr10 |
| 11 | | fload | B(r1+1,J,2),fr11 |
| 12 | | fload | B(r1+2,J,2),fr12 |
| 13 | | fload | B(r1+3,J,2),fr13 |
| 14 | | fmpy | fr1,fr10,fr10 |
| 15 | | fmpy | fr2, fr3,fr3 |
| 16 | | fmpy | fr2,fr11,fr11 |
| 17 | | fmpy | fr4, fr5,fr5 |
| 18 | | fmpy | fr4, fr12,fr12 |
| 19 | | fmpy | fr6,fr7,fr7 |
| 20 | | fmpy | fr6,fr13,fr13 |
| 21 | | fmpy | fr8,fr9,fr9 |
| 22 | | fadd | fr10,fr3,fr3 |
| 23 | | fload | B(r1,J,1),fr14 |
| 24 | | fadd | fr11,fr5,fr5 |

| FIG. 26A |
|---|
| FIG. 26B |

FIG. 26B

Object Program

| Instruction Number (61) | Label (62) | Instruction (63) | Operand (64) |
|---|---|---|---|
| 25 | | fload | B(r1+1,J,1),fr15 |
| 26 | | fadd | fr12,fr7,fr7 |
| 27 | | fload | B(r1+2,J,1),fr16 |
| 28 | | fadd | fr13,fr9,fr9 |
| 29 | | fload | B(r1+3,J,1),fr17 |
| 30 | | fadd | fr3,fr14,fr14 |
| 31 | | fadd | fr5,fr15,fr15 |
| 32 | | fadd | fr7,fr16,fr16 |
| 33 | | fadd | fr9,fr17,fr17 |
| 34 | | fstore | fr14,C(r1,J) |
| 35 | | fstore | fr15,C(r1+1,J) |
| 36 | | fstore | fr16,C(r1+2,J) |
| 37 | | fstore | fr17,C(r1+3,J) |
| 38 | | add | r1,#4,r1 |
| 39 | | cmp | r1,#252 |
| 40 | | ble | loop |

7 → (points to instruction 27)

FIG. 27

| Number | Instruction number | Referenced array element | Hit status | Accepted block | Rejected block | Cache miss caused by cache conflict |
|---|---|---|---|---|---|---|
| | 1 | A(1,J) | Miss | A(1:4,J) | | |
| | 2 | A(2,J) | Hit | | | |
| | 3 | B(1,J,3) | Miss | B(1:4,J,3) | | |
| | 4 | A(3,J) | Hit | | | |
| | 5 | B(2,J,3) | Hit | | | |
| | 6 | A(4,J) | Hit | | | |
| | 7 | B(3,J,3) | Hit | | | |
| | 8 | A(5,J) | Miss | A(5:8,J) | | |
| | 9 | B(4,J,3) | Hit | | | |
| I=1 | 10 | B(1,J,2) | Miss | B(1:4,J,2) | A(1:4,J) | |
| to | 11 | B(2,J,2) | Hit | | | |
| I=4 | 12 | B(3,J,2) | Hit | | | |
| | 13 | B(4,J,2) | Hit | | | |
| | 23 | B(1,J,1) | Miss | B(1:4,J,1) | B(1:4,J,3) | |
| | 25 | B(2,J,1) | Hit | | | |
| | 27 | B(3,J,1) | Hit | | | |
| | 29 | B(4,J,1) | Hit | | | |
| | 34 | C(1,J) | Miss | C(1:4,J) | B(1:4,J,2) | |
| | 35 | C(2,J) | Hit | | | |
| | 36 | C(3,J) | Hit | | | |
| | 37 | C(4,J) | Hit | | | |

COMPILE METHOD FOR REDUCING CACHE CONFLICT

CROSS REFERENCE TO RELATED APPLICATION

This application is a continuation of copending patent application Ser. No. 08/303,007, filed Sep. 8, 1994, now abandoned entitled "Compile Method for Reducing Cache Conflict."

BACKGROUND OF THE INVENTION

1. Field of the Invention

This invention concerns a method of compiling programs which are executed on computers having cache memory, and more specifically, such a method which generates code that reduces, by as much as possible, cache conflicts which would otherwise occur due to conflicting cache access during execution of these programs.

2. Description of the Prior Art

Cache memory and cache conflict are described in works such as J. Hennessy and D. Patterson, *Computer Architecture: A Quantitative Approach*, (©1990 Morgan Kaufmann Publishers, Inc., Palo Alto, Calif.), pages 408–425.

Cache memory (referred to hereafter simply as "cache") is a type of rapidly accessible memory which is used between a processing device and main memory. By placing a copy of one portion of data residing in main memory into cache, data referencing speed, i.e., the speed at which this data is accessed, can be increased. The units of data transferred between cache and main memory are called "blocks"; blocks in cache are called "cache blocks", while blocks in main memory are called "memory blocks".

As to methods of implementing caches, there are three mapping methods which place copies of memory blocks into cache blocks: the full associative method, the set associative method, and the direct map method. Recently, to provide caches with enhanced capacity and increased speed, the direct map method is coming into mainstream use.

With the direct map method, the cache blocks, into which memory blocks are mapped, are uniquely determined. Since cache capacity is generally smaller than main memory capacity, multiple memory blocks are mapped into one cache block. Because of this, even if a piece of data has been transferred to a cache block, if the data that was previously written into that cache block is now rejected from the cache block due to a reference of another memory block now mapped in the same cache block, a cache miss will be generated with the next reference.

This phenomenon is called "cache conflict"; cache misses generated by this phenomenon are called "cache misses caused by cache conflict". One drawback of the direct map method is that with certain programs, a substantial amount of cache conflict is generated, causing a marked drop in performance.

FIGS. 2 through 7 show cache conflict in detail. Hereafter, and for purposes of illustration and simplicity, I will assume the use of the direct map method with a block length of 16 bytes and a cache capacity of 256Kbytes (256×1024 bytes).

FIG. 2 shows a source program; FIG. 3 shows an overview of the status of mapping from main memory to cache; FIGS. 4 and 5 show, in increased detail over that in FIG. 3, the status of mapping from main memory to cache; FIG. 6 shows an example of an object program for the source program of FIG. 2; and FIG. 7 shows the generation of a cache conflict.

First, FIG. 2 shows an illustration program, here a source program, in which multiple cache conflicts are generated. In this source program 3, with a common declaration, arrays A, B, and C are allocated consecutively in the memory area in this order. Arrays A and C are two dimensional arrays; array B is a three dimensional array. Each array is a real type (floating point numbers) with element length of 4 bytes. The declared size for array A is (256, 128), for array B is (256, 128, 3), and array C is (256, 128). The execution portion of program 3 is a doubly nested loop. For the innermost loop, for I=1 to 255, the C(I,J) value is calculated using the values A(I,J), B(I,J,2), A(I+1,J), B(I,J,3), and B(I,J,1).

FIG. 3 shows a part of each array residing within main memory 120 and its corresponding part of cache 110, and the correspondence relationship itself. The size of each area in the memory that contains the parts of arrays, specifically A(1:256,1:128), B(1:256,1:128,1), B(1:256,1:128,2), B(1:256,1:128,3), and C(1:256,1:128), is 128Kbytes (=256*128*4). Accordingly, arrays A(1:256,1:128), B(1:256,1:128,2), and C(1:256,1:128) are mapped in one common area in cache 110, while arrays B(1:256,1:128,1) and B(1:256,1:128,3) are also mapped in another common area in cache 110. The above mentioned expressions "m:n" show the range of subscripts from lower bound m to upper bound n.

FIGS. 4 and 5 collectively show, in detail, the structure of cache 110 as well as its mapping with main memory 120.

As shown, cache 110 is a collection of unitized 16 byte cache blocks, illustratively cache blocks 111 to 116. Main memory 120 is also shown with unitized memory blocks. Mapping from memory block 120 to cache 110 is shown with arrows.

For example, in FIG. 4, three memory blocks A(1:4,J), B(1:4,J,2), and C(1:4,J) are mapped into one common cache block 111. However, only one of these three memory blocks can reside in cache block 111 at any one time. Because of this, cache conflict can arise where the data is referenced in these memory blocks through the cache. Similarly, cache conflict also occurs in cache blocks 112 and 113.

Since, as shown in FIG. 5, two memory blocks belonging to the same array (B) are mapped into each one of three common cache blocks, cache conflict can be generated here as well. Consequently, as shown in this figure, cache conflict is also generated for accesses within the same array (B).

FIG. 6 is an example of an object program that corresponds to source program 3 shown in FIG. 2. However, FIG. 6 only shows the object code for the innermost loop in FIG. 2. Since generally during execution of the program, the greater portion of the processing time is spent executing the innermost loop, the remaining portions, at least for this discussion, are not very important and, for simplicity, will be ignored.

In FIG. 6, each instruction is identified by a unique instruction number 61 (specifically numerals 1—13) added to the left side of the figure. The label 62 is used as a branch target for branch instructions. Processing contents 65 of each instruction 63 for operand 64 are shown all the way to the right in this figure. Of these instructions, instructions 1, 2, 4, 5, 8 and 10 are memory reference instructions, inasmuch as they reference array elements A(I,J), B(I,J,2), A(I+1,J), B(I,J,3), B(I,J,1), and C(I,J) respectively.

In FIG. 7, the cache conflicts caused by memory reference instructions in the object program, shown in FIG. 6, are depicted in the order in which these instructions are executed. Each line shows, from the left: a value 70 (I value) for innermost loop control variable I; instruction number 71 with each different instruction carrying its specific instruction number from FIG. 6; instruction referenced array element 72; cache hit status 73 (shows whether or not referenced data exists in cache); accepted block 74, i.e., the memory block which was transferred from main memory 120 and placed in cache 110; rejected block 75, i.e., the memory block which was rejected from cache 110, and cache miss 76 which shows whether this miss was caused by a cache conflict.

As can be seen from FIG. 7, cache misses occur with all of the memory references, with most of these cache misses caused by cache conflict. For example, instructions 1 and 4 for I=1 both reference the same memory block A(1:4,J), but because memory block B(1,J,2) which is now mapped in the same cache block as was block A(1:4,J) previously referenced by instruction 2, block A(1:4,J) is rejected from cache. This causes a cache miss to occur with instruction 4.

Of the cache misses shown in FIG. 7, the cache misses generated by referencing the same memory block twice are all cache misses caused by cache conflict. Of the 24 cache misses from I=1 to I=4, 18 of them are cache misses caused by cache conflict. Thus, it is clear that cache conflict is a major reason for cache misses.

One method of reducing cache conflict is using the full associative method or the set associative method as shown in the above prior art. However, with either of these methods, the implementing caching hardware becomes complex and cache referencing speed is reduced. Furthermore, with each of these methods, it is difficult to significantly increase the capacity of the cache.

Moreover, with set associative method based cache, when the number of cache block candidates (associativity) to which the memory blocks are mapped is small, it is not possible to sufficiently avoid cache conflict. Consequently, for this type of cache, even when the associativity is small, use of a cache conflict reduction method is still quite necessary.

With the direct map method, cache conflict may be reduced by simply increasing the capacity of cache memory. However, when compared with the cost of main memory of the same capacity, cache memory costs significantly more than main memory, hence limits exist to increasing cache capacity.

As shown above, because the structure of direct map method cache is simple, this method has the advantages of providing enhanced access speed and ease of expanding cache capacity. However, with certain programs, disadvantageously cache conflict occurs and performance is greatly lessened. Until the present invention, as described below, a sufficient way did not exist to reduce cache conflict in direct map method cache.

Even with set associative method based cache which generates relatively little cache conflict, nevertheless when associativity is small, cache conflict occurs and performance is greatly lessened. If the associativity is sufficiently increased, all of the cache conflict can be avoided, but at the cost of complicating the ensuing caching hardware structure, lowering cache referencing speed and making any significant increase in cache capacity quite difficult. Based on these reasons, the associativity of the set associative method based cache currently available on the commercial market is approximately 2 to 4, which, for programs that might generate an appreciable amount of cache conflict, is inadequate, in practice, to sufficiently prevent the cache conflict from occurring.

SUMMARY OF THE INVENTION

The purpose of this invention is to provide a method for reducing cache conflict for programs that are otherwise susceptible to a marked decrease in performance due to cache conflict.

To achieve this purpose in computers with cache memory, the present invention detects, during program compilation into object code, the generation of cache conflict, which occurs between memory references in the input program. The invention also performs cache conflict analysis to determine which specific memory references cause the cache conflict.

Based on the results of this analysis, when a cache conflict is detected and before all references would have been completed to a memory block previously transferred to a cache block, i.e., before all those references would be embodied in compiled object code ready to be executed, the memory references in the compiled object program are reordered such that the memory block would now not be rejected from cache.

The reordering of memory references is done on the compiler intermediate code or on the object program generated by the compiler. Alternatively, memory references on the compiler intermediate code can be reordered followed by a further reordering of the appropriate references on the object program generated by the compiler. Furthermore, the memory references on the program intermediate code can be reordered with resulting reordered intermediate code then being reverse converted (reverse compiled) back to a new source program version. This new version should ultimately generate far fewer, if any, cache conflicts. That version is then provided as an output source program for subsequent compilation and execution either in the computer which generated this program or another computer.

My inventive method for use with computers with cache memories includes a cache conflict analysis step for detecting cache conflicts related to memory references in input source programs that are being compiled into object code. This step provides, as output cache conflict information, analyzed cache conflict generation conditions. In conjunction with the analysis step, my inventive method includes a memory reference reordering step that changes the order of memory references in the source program, as it is being compiled, and particularly in corresponding intermediate code therefor, so that a memory block is not rejected from cache before all references to memory blocks, previously transferred to a common cache block, would have been completed.

The above cache conflict analysis step includes a cache reference group analysis step in which memory references in the input program are extracted, and, thereafter, memory references to the same memory block are grouped as a cache reference group. During the latter step, the cache reference groups are classified with cache reference group information being then generated as cache conflict information. After the cache conflict information is generated, a cache conflict graph analysis step is performed through which, based on the cache reference group information, a graphical output depiction of cache conflict information is provided which shows the cache conflict conditions among different cache reference groups.

When address distances, in main memory, among the memory references in the source program are below a designated value, the cache reference group analysis step concludes that these memory references are referencing the same memory block, and assigns these references to the same cache reference group.

The cache reference group analysis step obtains memory blocks referenced to positions (addresses) in main memory of the memory references in the input program, and, for those memory references which refer to a common memory block, assigns those references to the same cache reference group.

For arbitrary first and second cache reference groups included in the cache reference group information, the above cache conflict graph analysis step obtains a minimum value cache distance between all of the memory references included in the first cache reference group and all of the memory references included in the second cache reference group. When the minimum value is below the designated value, cache conflict is viewed as being generated between the memory references of the first cache reference group and the memory references of the second cache reference group.

Furthermore, for the arbitrary first and second cache reference groups, the cache conflict graph analysis step also obtains the cache blocks mapped from the main memory position of all the memory references included in the first cache reference group, and likewise obtains the cache blocks mapped from the main memory position of all the memory references included in the second cache reference group. When there are memory references mapped to the same cache block, this step concludes that cache conflict is generated between the memory references of the first cache reference group and the memory references of the second cache reference group.

After performing loop unrolling for a loop in the input program, the memory references reordering step, described above, changes the order of instructions to coincide with the order of the memory references. In particular, the loop that is to be unrolled and the loop unrolling count therefor are both selected such that the loop has a memory reference range length of approximately the same length, once the loop is unrolled, as the cache blocks.

As a result of using my inventive method with each of those programs which would otherwise exhibit cache conflicts and hence lowered performance, a corresponding object program or associated source program is generated that manifests fewer, if any, cache conflicts.

By detecting when cache conflicts would be generated in the input program, then, in accordance with my present invention, specific processing can then be performed on that program which mainly focuses on eliminating these cache conflicts. Generally, when a cache conflict occurs, a marked decrease in performance results. Therefore, cache conflict reduction should be made a priority, for specified items, through detection of cache conflict generation areas.

By doing cache conflict analysis, with the concomitant reordering of memory references, those memory references which would otherwise cause each cache conflict can be determined.

Moreover, by reordering these memory references, cache conflict, in those memory areas where cache conflict would otherwise occur, can be avoided. For example, in order for a memory block not to be rejected from cache before all references, in that input program, to memory blocks previously transferred to a cache block would have been completed, cache misses caused by cache conflict can be completely and advantageously avoided, as I now teach, by changing the order of the memory references in the program.

By reordering the memory references for the intermediate code, redundant data dependency, heretofore caused by allocating a small number of registers to memory reference instructions, is eliminated. This, in turn, advantageously increases the degree of freedom for changing the order of memory references. Because of this, memory references can be moved to optimal positions with a concomitant improvement in the amount of cache conflict reduction that results.

Advantageously, by reordering the memory references for the object program, all instructions including those which could not be foreseen at the intermediate code stage could be reordered. Hence, a very accurate instruction reordering could be accomplished to further reduce cache conflicts.

Furthermore, by reordering the memory references on both the program intermediate code and the object program, an optimal reduction in cache conflict could be obtained.

Additionally, by reordering the memory references for the program intermediate code, then reverse compiling the results to a source program with this latter program being supplied as an output source program for later use, any subsequent compiler operating on the output source program will, a priori, then generate code having reduced cache conflicts. Thus, through use of my inventive method, on one computer to generate source code with reduced cache conflicts and intended for eventual widespread distribution and execution on other computers, cache conflict reduction can be employed on a widespread basis thus increasing and possibly maximizing its general use.

By unrolling loops for reordering memory references, cache conflicts for multiple loop iterations can be eliminated, thereby further improving cache conflict reduction. In particular, by appropriately selecting the particular loops to be unrolled and the number of times each such loop is to be unrolled, the fewest loops will be unrolled consistent with highly effective loop unrolling. This, in turn, advantageously avoids having insufficient registers, and its attendant difficulties, which would otherwise occur whenever an excessive number of loops is to be unrolled.

BRIEF DESCRIPTION OF THE DRAWINGS

FIG. 6 shows a corresponding conventional object program for an inner-loop portion of source program 3 depicted in FIG. 2;

FIG. 7 shows conventional cache conflict generation that would occur for the object program shown in FIG. 6;

FIGS. 9A and 9B collectively show a detailed flowchart of cache reference group analysis step 32 shown in FIG. 8;

FIG. 19 shows the illustrative intermediate code shown in FIG. 16 but after the cache reference group numbers for cache conflicts have been written into this code;

FIG. 20 shows the proper orientation of the drawing sheets for FIGS. 20A and 20B;

FIGS. 20A and 20B collectively show the illustrative intermediate code shown in FIG. 19 but after both loop unrolling and variable renaming have been completed therein through execution of steps 53 and 54, respectively, shown in FIG. 13;

FIG. 21 shows the proper orientation of the drawing sheets for FIGS. 21A and 21B;

FIGS. 21A and 21B collectively show intermediate code in FIGS. 20A and 20B but after common array elements have been eliminated from this code through execution of step 55 shown in FIG. 13;

FIGS. 22A and 22B respectively show the structure of a loop unrolling candidate table in general, and, in particular, a loop unrolling candidate table for illustrative intermediate code 5 as it undergoes loop unrolling;

FIG. 23 shows a data dependency graph for intermediate code 5 shown in FIGS. 21A and 21B;

FIG. 24 shows the proper orientation of the drawing sheets for FIGS. 24A and 24B;

FIGS. 24A and 24B collectively show an illustrative schedule table to which statements in intermediate code 5 shown in FIGS. 21A and 21B have been allocated according to data dependency graph 24 shown in FIG. 23;

FIG. 25 shows the proper orientation of the drawing sheets for FIGS. 25A and 25B;

FIGS. 25A and 25B collectively show intermediate code 5 but after complete execution of my inventive cache conflict reduction method on the intermediate code shown in FIGS. 21A and 21B;

FIG. 26 shows the proper orientation of the drawing sheets for FIGS. 26A and 26B;

FIGS. 26A and 26B collectively show a resulting object program after execution of my inventive cache conflict reduction method and specifically that which results after object level compilation has been performed on intermediate code 5 shown in FIGS. 25A and 25B;

FIG. 27 shows the cache conflict generation that occurs for object code 7 shown in FIGS. 26A and 26B;

To facilitate reader understanding, identical reference numerals are used to denote identical or similar elements that are common to the figures.

DESCRIPTION OF THE PREFERRED EMBODIMENT

I will now describe the preferred embodiment of the invention while referring to the figures, several of which may be simultaneously referred to during the course of the following description.

Figure 1:
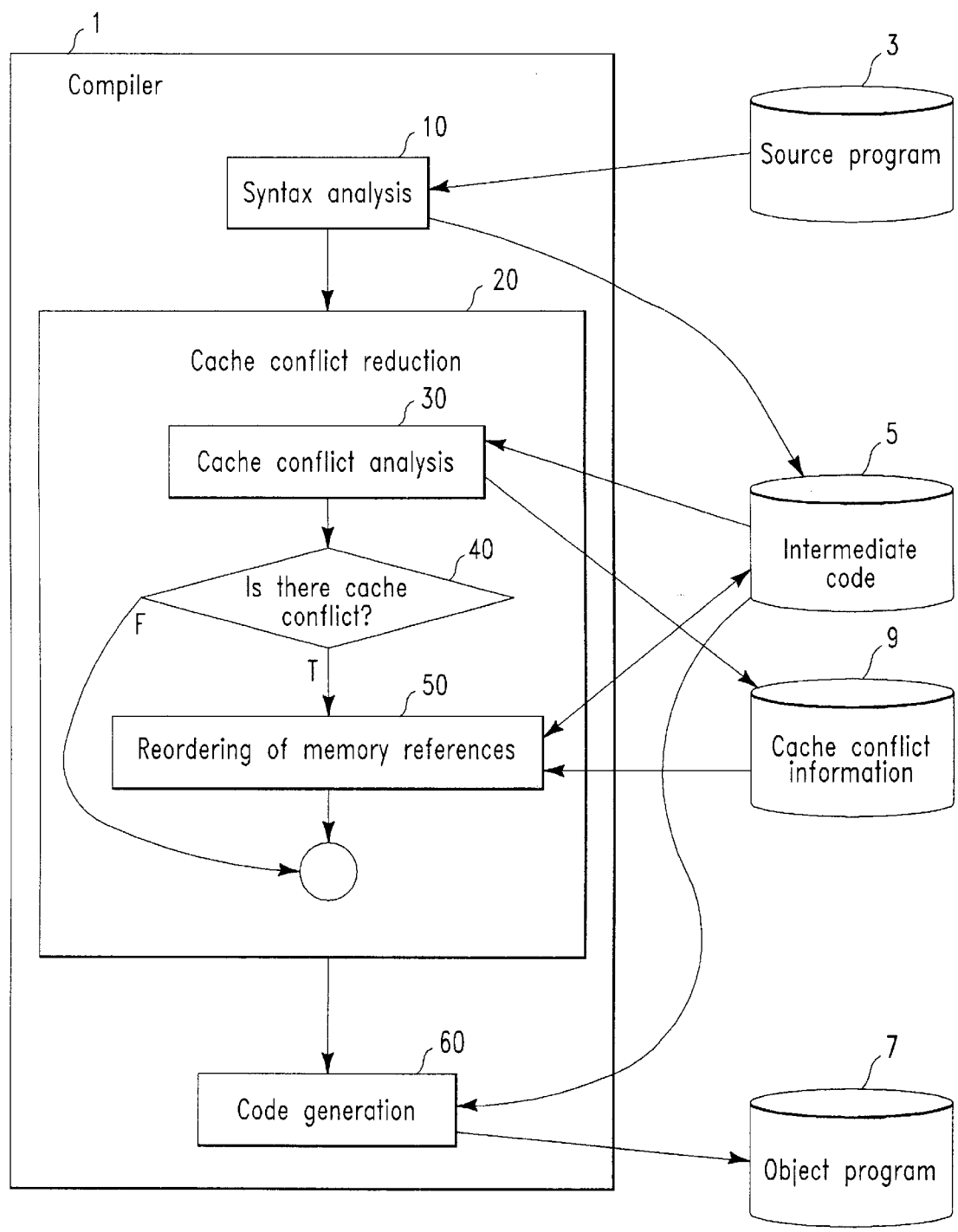
FIG. 1 is a block diagram of an example of a compiler using the compiling method of this invention.
Figure 28:
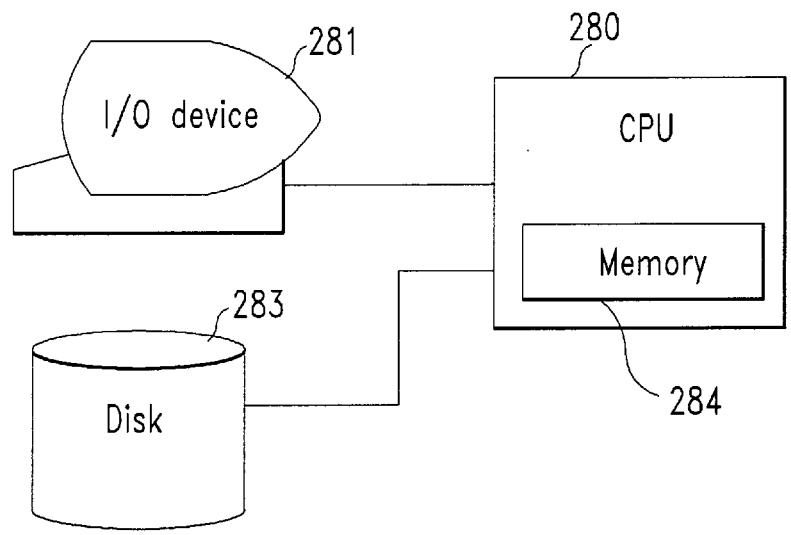
FIG. 28 shows the structure of a computer system for implementing my present invention.
Figure 29:
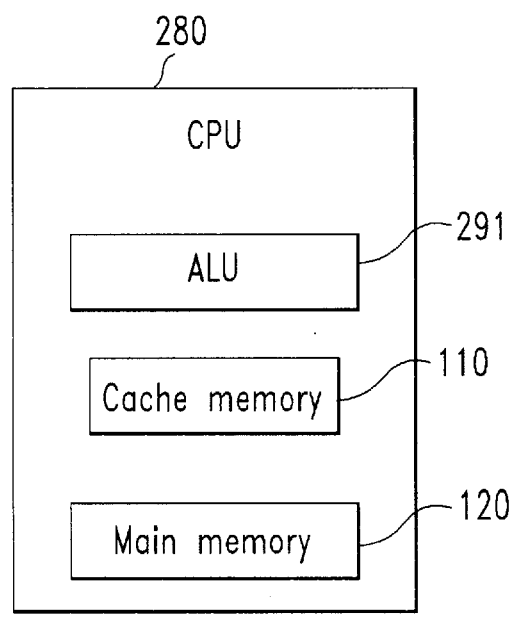
FIG. 29 shows the structure of the central processing unit (CPU) in the computer system, depicted in FIG. 28 and used to execute a program generated by the compile method of my present invention.

FIG. 1 shows the structure of an example of a compiler using the compile method of the present invention. FIG. 28 shows the structure of a computer system for implementing this invention. As shown in FIGS. 1 and 28, compiler 1 resides in memory 284 of central processing unit (CPU) 280, the program (and accompanying data) to be compiled resides in disk 283, and the display of analysis results and user instructions is presented through input/output (I/O) device 281. FIG. 29 shows the structure of CPU 280 which is executed by a program compiled by my inventive method. Within CPU 280, cache memory 110 (hereafter referred to simply as "cache") is installed between main memory 120 and arithmetic and logic unit (ALU) 291, the latter executing the program stored in main memory 120. The CPU also holds a portion of the program and accompanying data, all of which stored in main memory 120.

Now specifically referring to FIG. 1 and to facilitate understanding, I will now summarize the processing undertaken by this preferred embodiment as it relates to my invention.

Compiler 1 accepts source program 3, as input, and ultimately generates object program 7. Compiler 1 performs the following processes in order: syntax analysis process 10, cache conflict reduction process 20, and code generation process 60. With widely known technology, syntax analysis process 10 converts source program 3 into intermediate code 5 for subsequent use by the compiler. Cache conflict reduction process 20 is performed on intermediate code 5. Code generation process 60 generates object program 7 from intermediate code 5 but as altered by cache conflict reduction process 20.

Consequently, as readily seen, object program 7 is generated for input source program 3 but upon which cache conflict reduction process 20 was performed.

Next, I will explain the specific processing undertaken by cache conflict reduction process 20 which is characteristic of my invention. This processing contains three basic steps, with the processing composed of these three steps used on the intermediate code of the loops included within intermediate code 5. For purposes of simplifying the ensuing discussion, the following example limits the processing to the intermediate code of innermost loops. Of course, it is easy to process other intermediate code through my inventive method. Nevertheless, since most of the execution time for an object program is consumed in executing the innermost loops in that program, then, in almost all cases, processing only these innermost loops through my inventive method is sufficient. Hence, I will explain the processing undertaken by the three steps of cache conflict reduction process 20 in the context of the innermost loops.

In particular, within process 20, conflict analysis process 30 first detects whether intermediate code 5 would generate cache conflicts and then analyzes the conditions which would generate each conflict. The detected instances of cache conflicts, i.e., "cache conflict generation detection results", provided by process 30 are used in the following step, i.e., decision step 40. Cache conflict generation conditions are provided, by process 30, as cache conflict information 9 for subsequent use by memory reference reordering process 50.

Based on the results of cache conflict analysis 30, i.e., whether a cache conflict would be generated by intermediate code 5, decision step 40 determines whether memory reference reordering process 50 will then be executed. In particular, when such a cache conflict would be generated, as detected by cache conflict analysis process 30, a cache conflict is said to exist. Hence, decision block 40 routes execution to process 50 which, in turn, reorders the memory references to reduce, if not eliminate, these conflicts. Alternatively, if analysis process 30 finds that no cache conflict would be generated within intermediate code 5, decision block 40 routes execution around memory reference reordering process 50, hence skipping any such reordering, thus effectively terminating further processing of intermediate code 5.

Through memory reference reordering process 50, the order through which memory references would be carried out is changed based on cache conflict information 9 in order to reduce cache conflict. In essence, when the memory reference order is changed, the resulting order is such that all references to a memory block previously transferred to a cache block are completed before other conflicting memory references occur to the memory block; thus subsequently preventing the memory block from being rejected from cache.

With the above in mind, I will next describe the structure of data input and output for each step within cache conflict reduction process 20. Inasmuch as the specific structures of source program 3 and object program 7 are not related to my inventive process 20, these structures are omitted. However, the structure of intermediate code 5 and cache conflict information 9 will be explained.

Figures 2, 3:
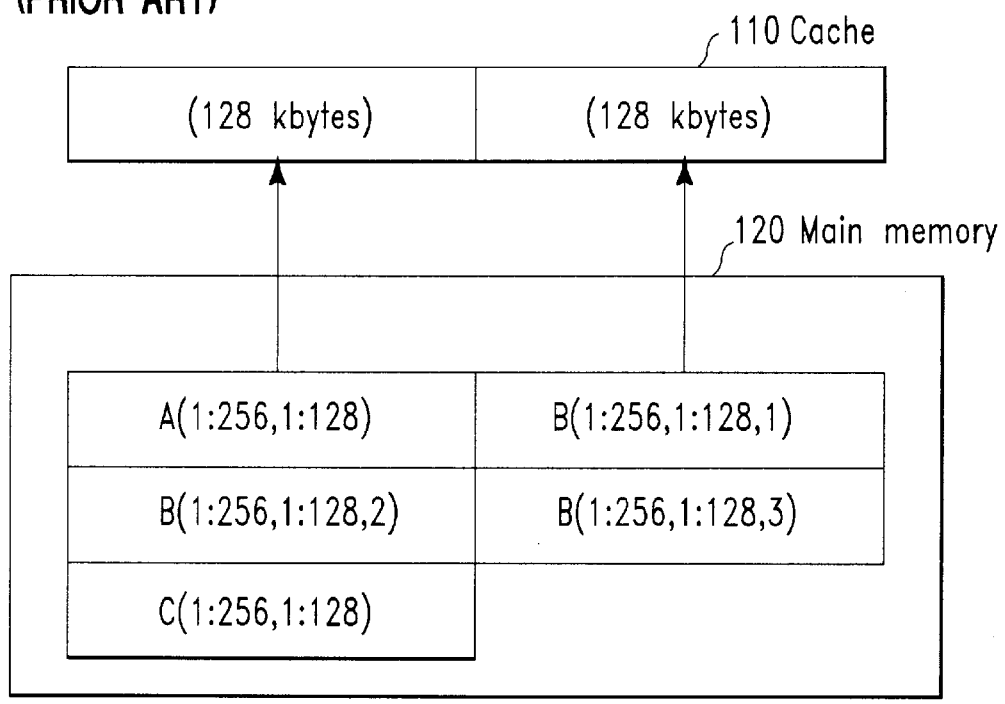
FIG. 2 shows an example of conventional source program 3 that can generate cache conflicts.
FIG. 3 shows an overview of conventional main memory mapping to cache for illustrative program 3 depicted in FIG. 2.
Figure 4:
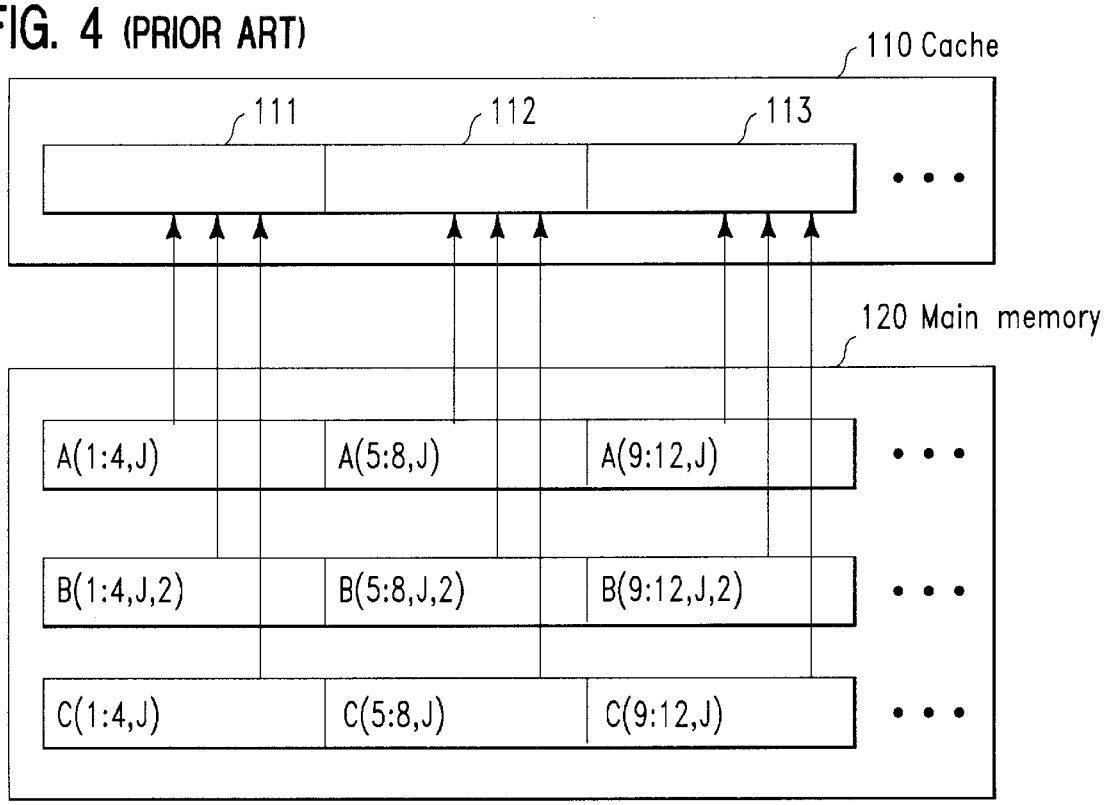
FIGS. 4 and 5 collectively show, in detail, the conventional main memory mapping to cache depicted in simplified form in FIG. 3.
Figure 5:
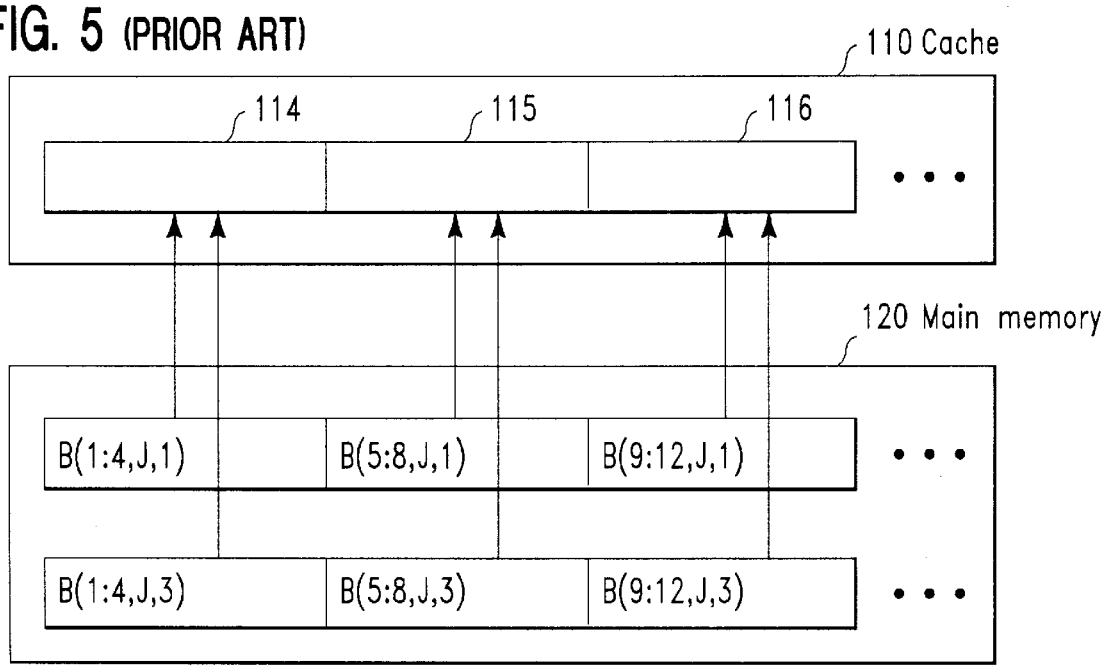

Specifically, intermediate code 5 is an internal compiled representation of a source program, the representation being similar to that shown in FIG. 2. In this preferred embodiment, a structure known as a three address statement is used for intermediate code 5. Three address statements are described in A. V. Aho and J. D. Ullman, *Compilers* (©1985, Addison Wesley Publishing Co.), pages 464–473. Two columns of data are required for use with cache conflict reduction process 20. In that regard, a statement number (305 shown in FIG. 16) column and reference group number (330) column are used along with the three address statements.

Figures 16, 17:
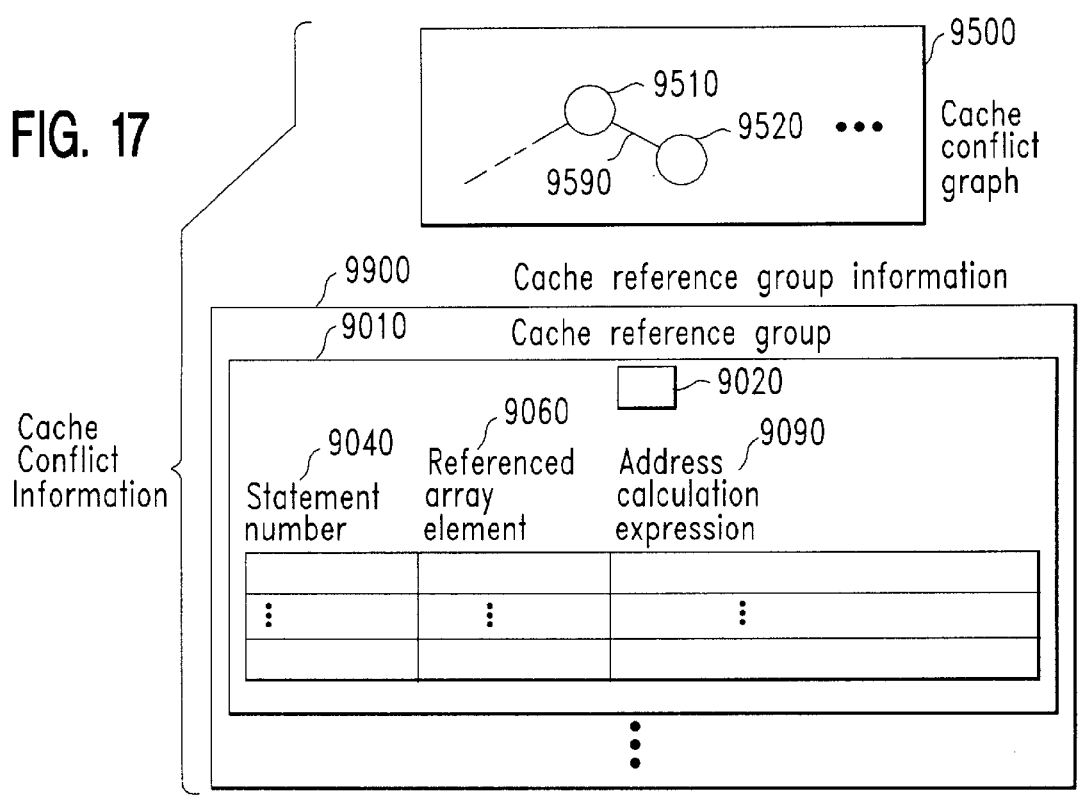
FIG. 16 shows illustrative intermediate code, for a portion of source program 3 shown in FIG. 2, and prior to processing that intermediate code to reduce cache conflicts therein.
FIG. 17 shows the general structure of cache conflict information, e.g., cache conflict information 9 shown in FIG. 1.

FIG. 16 shows an example of intermediate code 5. As shown, intermediate code 5 corresponds to source program 3, the latter shown in FIG. 2. As shown in FIG. 16, the statements in intermediate code 5 are lined up in execution order. Each of these statements is composed of: statement number 305, which starts at 1 and increases incrementally; label 310 which specifies a branch target; three address statement 320 and, as shown, its contents—all of such steps implementing the innermost loop in source program 3 (see FIG. 2); and reference group number 330 shown in FIG. 16 which is used as a work area by cache conflict reduction process 20. Label 310 is not used other than as a branch target. Reference group number 330 is added only to memory references; nothing is present in this column at the input to cache conflict reduction process 20.

By using a three address statement as the format of each statement in intermediate code 5, each memory reference is separated into individual statements. As such, it is easy to add such statements or change the order of memory reference statements. Though my inventive method can be implemented using other formats, than a three address statement, for intermediate code 5, accompanying processing does become increasingly complex.

It is sufficient to convert the source program to appropriate three address statements immediately prior to performing cache conflict reduction process 20. Hence, when performing optimization processing between syntax analysis process 10 (as shown in FIG. 1) and cache conflict reduction process 20, another format can be used for optimization processing. In that regard, a three address statement can be represented by, e.g., a syntax tree generally used for optimization processing; hence, the format of intermediate code 5 can be one consistent with a syntax tree.

Cache conflict information 9, as shown in FIG. 1, specifies the cache conflict generation conditions that result from memory references of those statements in intermediate code 5. Using FIG. 17, I will now explain the structure of cache conflict information 9.

As shown in FIG. 17, cache conflict information 9 is constructed from cache reference group information 9900 and cache conflict graph 9500. Cache reference group information 9900 is a summary of memory references to common memory blocks and consists of cache reference groups, only one of which, i.e., group 9010, is generally shown. These groups, in turn, are then classified as described below. Cache conflict graph 9500 shows the cache conflict generation conditions between cache reference groups. In other words, cache reference group information 9900 is a collection of cache reference groups, and each cache reference group, e.g., group 9010, is a collection of statements which perform memory references to the same memory block in intermediate code 5.

Specifically, each cache reference group, such as group 9010, is composed of a cache reference group number, e.g., number 9020, and for each memory reference statement in that group: a statement number (9040 denoting all such statement numbers in this group), a referenced array element (9060 denoting all such array elements in this group), and an address calculation expression (9090 denoting all such expressions in this group) for corresponding referenced array element 9060.

With the group number of cache reference group 9010 as a node, cache conflict graph 9500 has edges (lines) between each pair of separate cache reference groups which generate each cache conflict. Having a cache conflict generated between two cache reference groups means that the memory blocks which reference the memory reference statements in each cache conflict group, e.g., group 9010, are mapped into the same cache block. As specifically shown in FIG. 17, nodes 9510 and 9520 of cache conflict graph 9500 are connected by edge 9590; hence, this figure shows that a cache conflict is generated between two cache reference groups corresponding to these two nodes.

I have now completed my summary explanation of the inventive compiler shown in FIG. 1. Accordingly, I will proceed to explain, in detail and in conjunction with a specific example, the processing undertaken by cache conflict analysis process 30, and later in the context of this example, the ensuing results, and thereafter memory reference reordering process 50—both of these steps being contained within cache conflict reduction process 20 shown in FIG. 1.

I will begin by explaining, in detail, cache conflict analysis process 30. Through process 30, memory references in intermediate code 5 such as those shown in FIG. 16 are analyzed, and resulting cache conflict information 9, as shown in FIG. 17, is generated.

Figure 8:
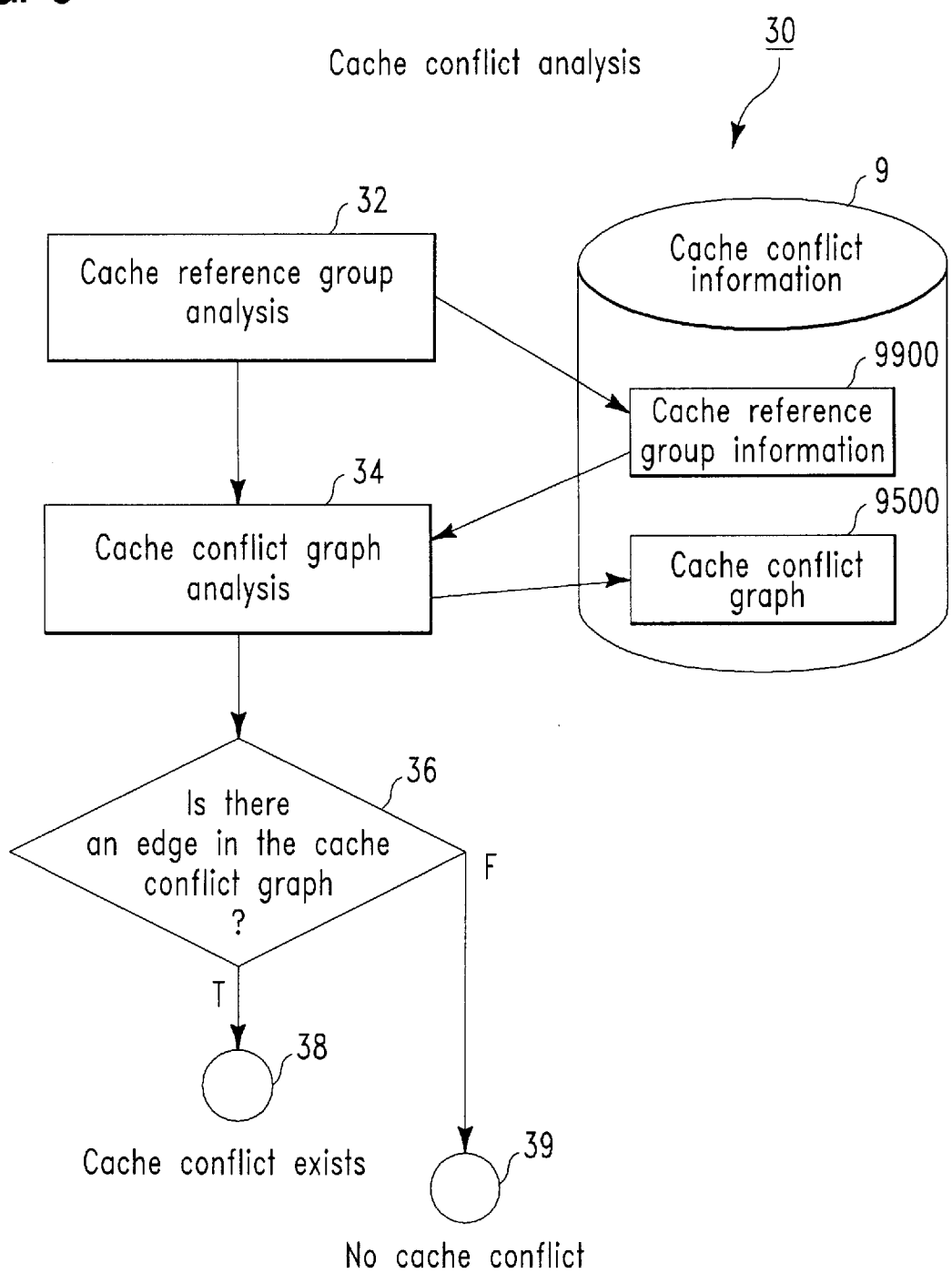
FIG. 8 is a high-level flowchart of cache conflict analysis process 30 shown in FIG. 1.

FIG. 8 shows a high-level flowchart of the processing procedure of cache conflict analysis process 30 shown in FIG. 1.

As shown in FIG. 8, upon entry into process 30, execution proceeds to cache reference group analysis step 32. This latter step, through analyzing the memory reference statements in intermediate code 5 (shown in FIG. 16), summarizes references to memory blocks as cache reference groups (such as group 9010 shown in FIG. 17), and generates cache reference group information 9900. Next, cache conflict graph analysis step 34 is executed which, based on cache reference group information 9900, analyzes cache conflict conditions between different cache reference groups, and generates cache conflict graph 9500 in, e.g., graphical form, which represents the results of this analysis.

Thereafter, decision step 36, when executed, determines whether or not an edge exists in cache conflict graph 9500, i.e., whether this graph shows a conflict between two cache reference groups. If such an edge exists, decision step 38 routes execution, via its true (T) path, onward to step 38, at which point processing of step 30 ends. Alternatively, if no such edge exists, decision step 38 routes execution, via its false (F) path, onward to step 39 at which point no cache conflict is said to exist and processing ends. The result, if true, from process 30, specifically the fact that an edge exists in graph 9500, is passed onward to decision step 40 shown in FIG. 1.

Next, using FIGS. 9A–12, I will explain, in detail, the processing undertaken by cache reference group analysis step 32 and cache conflict graph analysis step 34 shown in FIG. 8.

Figure 9:
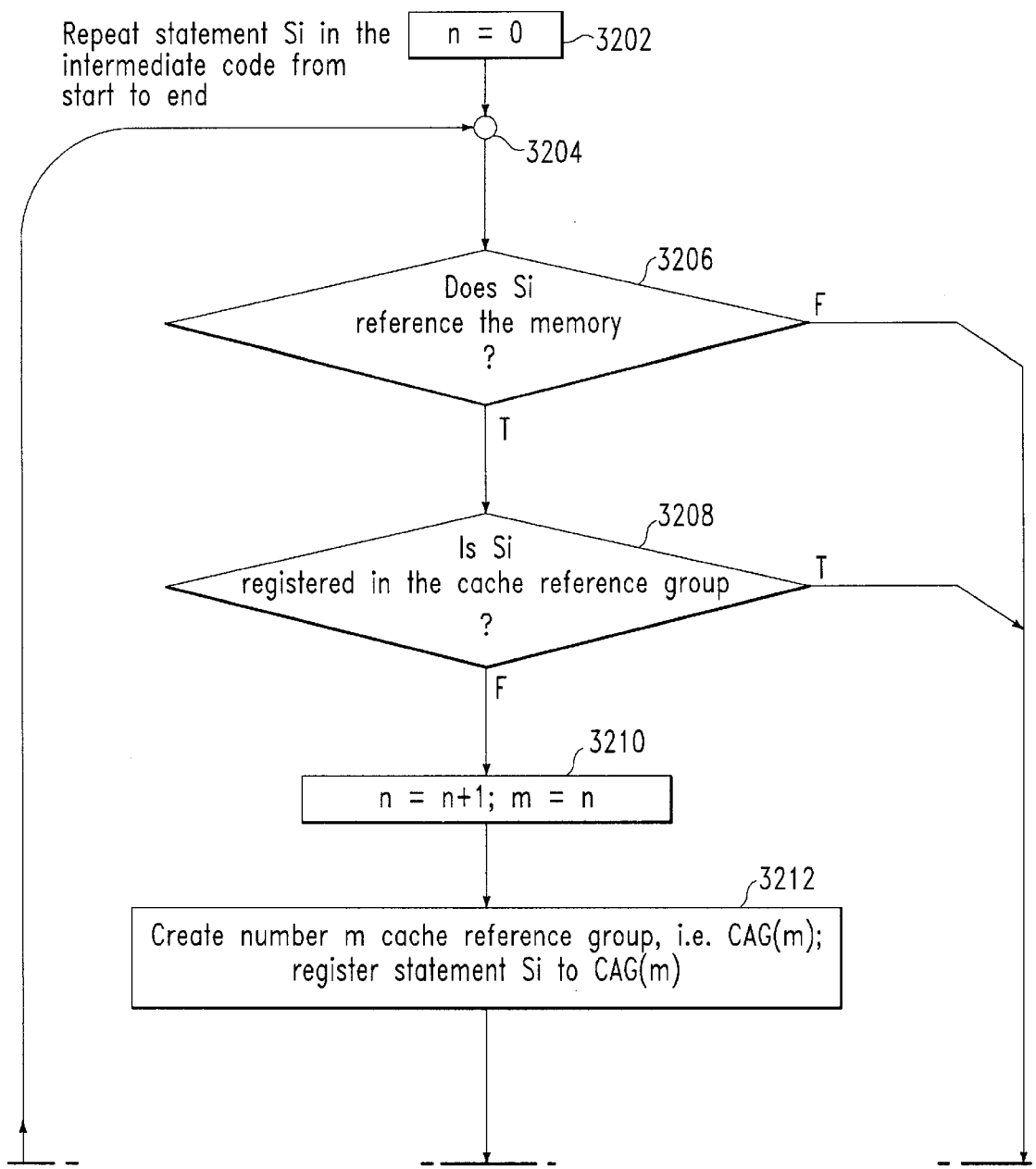
FIG. 9 shows the proper orientation of the drawing sheets for FIGS. 9A and 9B.
Figure 9B:
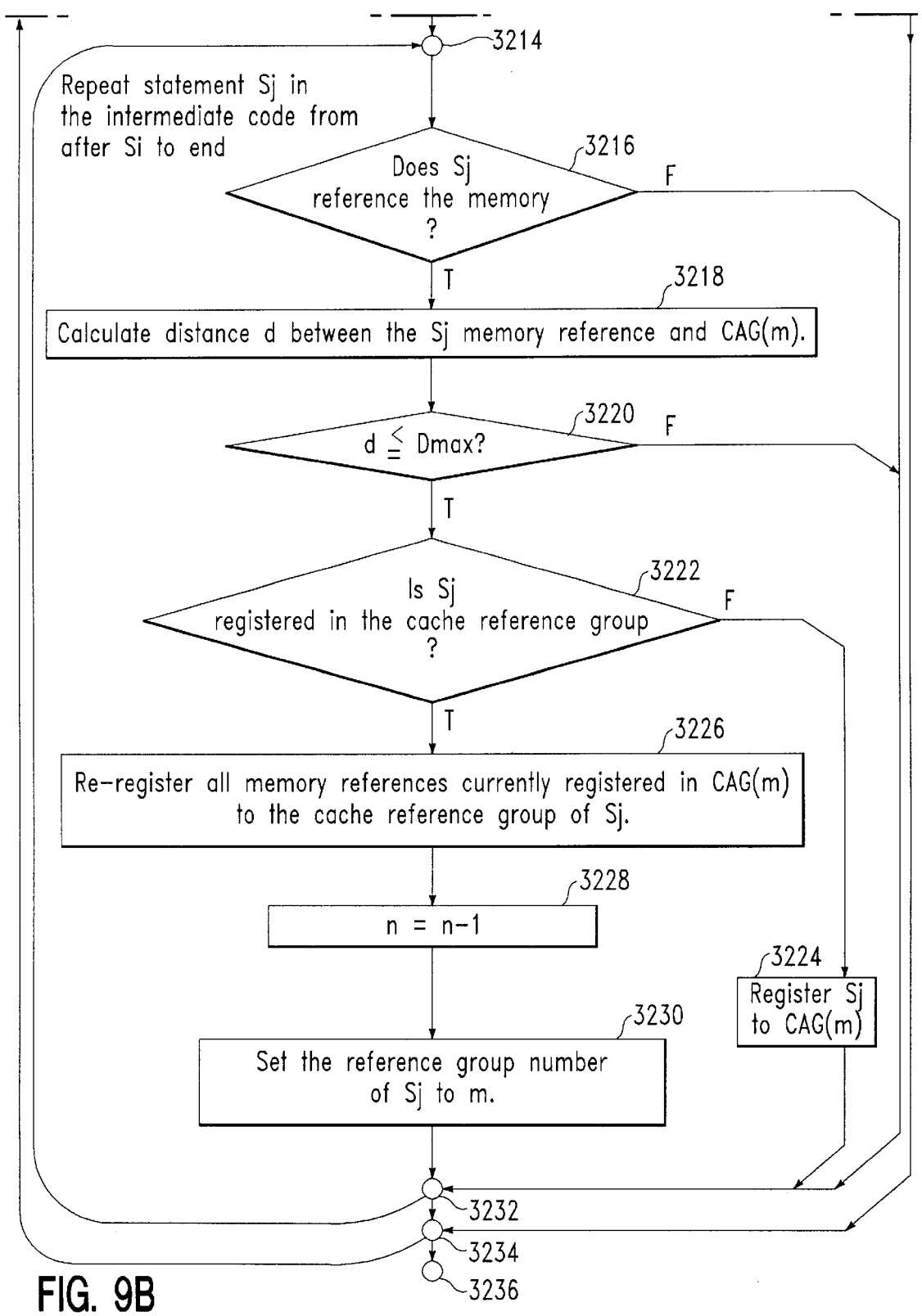

FIGS. 9A-9B collectively show a detailed flowchart of cache reference group analysis step 32; the correct orientation of the drawing sheets for these figures is shown in FIG. 9. As explained above, through execution of cache reference group analysis step 32, cache reference group information 9900 is generated from intermediate code 5.

Upon entry into step 32, as shown in FIGS. 9A-9B, through execution of step 3202 cache reference group number n is initialized to zero. Steps 3204 and 3234 represent a "repeat" ("looping") operation. Processing is done, within step 32, in order from the first statement to the last statement of intermediate code 5, with the current statement being processed in code 5 being denoted by variable Si.

Thereafter, decision step 3206, when executed, determines whether statement Si references memory, i.e., whether that statement is, among other things, a memory reference statement. If this statement references memory, execution proceeds, via the true (T) path from this decision step to decision step 3208. Alternatively, if statement Si does not reference memory, then this statement is not processed further by cache reference group analysis step 32 and execution proceeds, via the false (F) path emanating from decision step 3206, onward to step 3234. Decision step 3208, when executed, determines whether statement Si has been registered to (associated with) any cache reference group, e.g., group 9010. If no such registration has occurred, decision step 3208 routes execution, via its false path, forward to step 3210. Alternatively, if statement Si has already been registered to any cache reference group, then no further processing occurs within step 32 for this statement and execution proceeds, via the true path emanating from decision step 3208, onward to step 3234 to process the next statement.

Step 3210, when executed, increments number n by 1 and then sets variable m to the current n value. Variable m is the initial value of the cache reference group number for the corresponding cache reference group that will be processed in the following steps. Cases exist where the value of variable m changes while processing of a cache reference group is in progress.

After step 3210 has been executed, step 3212 is executed to establish cache reference group CAG(m), for which the cache reference group number is m, and to register statement Si to this cache reference group, i.e., CAG(m). As shown in FIG. 17, when statement Si is registered, a statement number (9040), a referenced array element (9060), and an address calculation expression are written for this statement to cache reference group information 9900, and specifically to an entry for cache reference group CAG(m). Because the method for obtaining the address calculation expression (9090) from the referenced array element (9060) is widely known, it will be omitted here.

Next, as shown in FIGS. 9A and 9B, steps 3214 to 3232 are repetitively performed to process the statement that immediately follows statement Si, i.e., statement S(i+1), until the last statement. For ease of reference, the particular statement currently being processed by these steps is denoted as statement Sj.

Decision step 3216, when executed, determines whether statement Sj references memory, i.e., whether this statement is, among other things, a memory reference statement. If statement Sj references memory, execution is routed by this decision block, via its true path, onward to step 3218. Alternatively, if statement Sj does not reference memory, then this statement is not processed further with execution routed, via a false path emanating from decision block 3216, onward to step 3232.

When executed, step 3218 calculates a distance, d, between memory reference statement Sj and cache reference group CAG(m). The distance between memory reference x and cache reference group y is a minimum value of distance in main memory between memory reference x and all the memory references registered to cache reference group y. The calculation method for this distance is explained in detail later through FIG. 10.

Once step 3218, shown in FIGS. 9A and 9B, is completed, execution proceeds to decision step 3220, which determines whether distance d is less than or equal to a designated value Dmax. If distance d is less than or equal to Dmax, decision step 3220 routes execution, via its true path, onward to decision step 3222. Alternatively, if distance d exceeds Dmax, then statement Sj is not processed further with decision block 3220 routing execution, via its false path, to step 3232.

Designated value Dmax is a "threshold value" for determining whether or not memory references refer to the same memory block and is based on the distance between memory references in main memory. This threshold value should be set equal to ("the memory block length")/2. If distance d is less than or equal to the threshold value Dmax, then both memory references basically refer to the same memory block. As described below and with reference to this preferred embodiment, it has been determined that Dmax is preferably equal to 4. However, Dmax is not so limited as long as the value chosen for Dmax is one which can be used to determine whether or not two memory references refer to the same memory block.

Consequently, in the preferred embodiment, decision block 3220 determines whether or not memory reference statement Sj and the memory reference in cache reference group CAG(m) refer to the same memory block.

An alternate method for determining whether or not memory references refer to the same memory block relies on directly obtaining the referenced memory block from the position in main memory of the referenced array element. However, here, since the array element address changes depending on the loop iteration, one must necessarily and sufficiently consider that the referenced memory block also changes; hence, processing becomes somewhat complex. Nevertheless, this alternate method, if sufficiently expanded in this way, could be used with the preferred embodiment.

Decision step 3222, when executed, determines whether statement Sj is registered to any of the existing cache reference groups, e.g., group 9010. If statement Sj is not so registered, then this decision block routes execution, via its false path, to step 3224. Through execution of step 3224, processing statement Sj is registered to cache reference group CAG(m), from which step execution proceeds forward to step 3232. Alternatively, if decision block 3222 determines that statement Sj is registered in an existent cache reference group, then this decision block routes execution, via its true path, to block 3226.

Through execution of steps 3226 to 3230, the memory references in cache reference group CAG(m) are merged with existing cache reference groups. First, step 3226, when executed, re-registers all memory references currently registered in cache reference group CAG(m), into the one cache reference group, of groups 9010, to which statement Sj belongs. Next, through execution of step 3228, value n is decremented by one, and cache reference group CAG(m) is eliminated. Thereafter, through execution of step 3230, the cache reference group number of Sj is set to m.

Steps 3232 and 3234 represent ends of repeat (loop) processing; step 3236 represents the end of execution of cache reference group analysis step 32.

Next, I will describe the processing inherent in step 3218 mentioned above, specifically, the calculation of the distance d between the memory references of processing statement Sj and cache reference group CAG(m).

Figure 10:
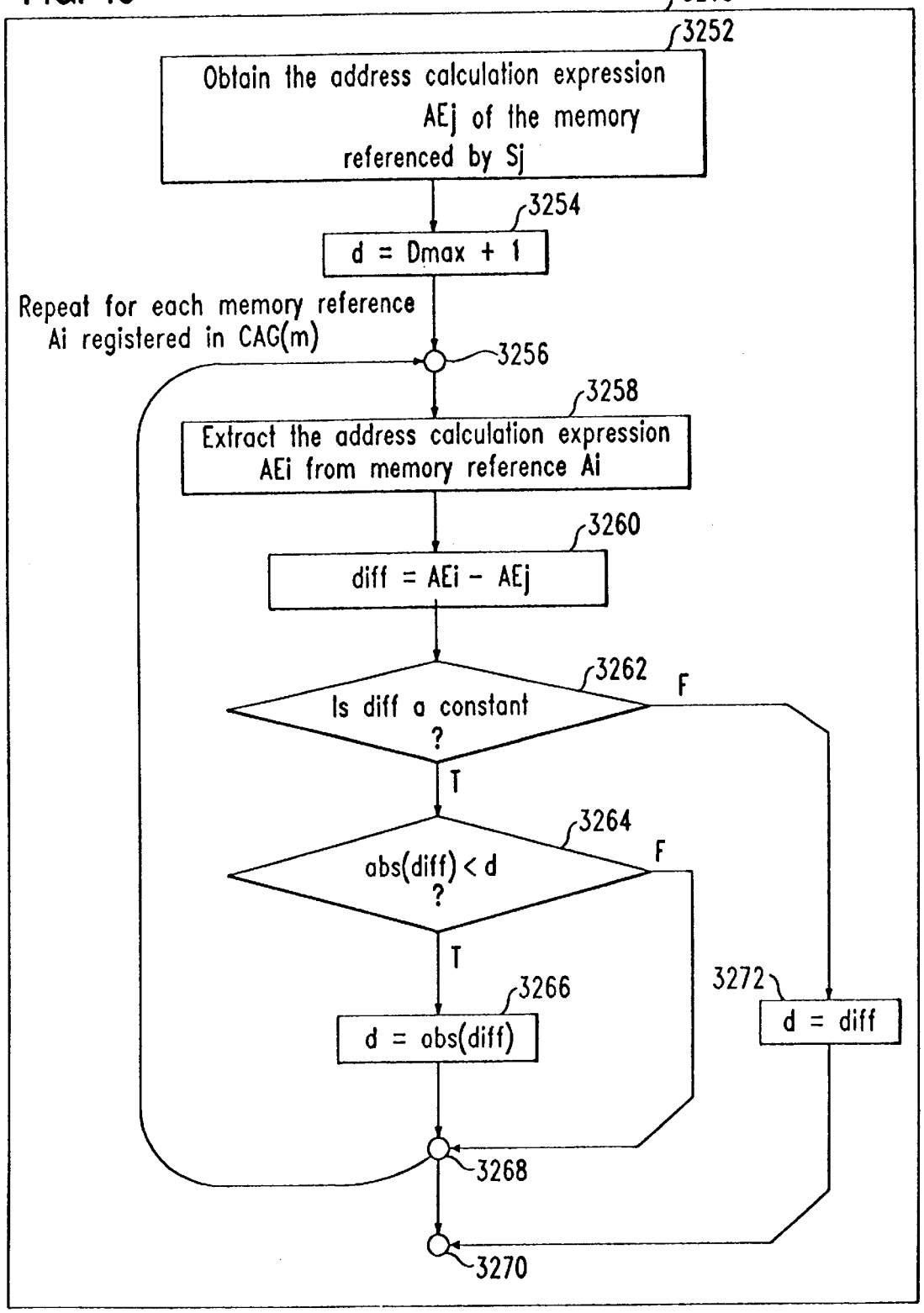
FIG. 10 is a detailed flowchart of distance calculation step 3218 executed within cache reference group analysis step 32 shown in FIGS. 9A and 9B.

FIG. 10 shows a detailed flowchart of distance calculation step 3218. Upon entry into step 3218, execution proceeds to step 3252, which obtains the address calculation expression AEj for the memory referenced by statement Sj. The address calculation expression AEj can be easily obtained from array elements specified by memory references. Since this is a well known method, I will omit all detailed explanation thereof.

Thereafter, execution proceeds to step 3254 which sets the initial value of d equal to Dmax+1. This is followed by repetitive execution of steps 3256 to 3268. Steps 3256 to 3268 are executed sequentially for all memory references Ai registered in cache reference group CAG(m) which is one of the cache reference groups 9010.

Through execution of step 3258, the address calculation expression, AEi, 9090 of memory reference Ai is extracted from cache reference group CAG(m). Thereafter, step 3260 is executed to calculate a difference, diff, between address calculation expressions AEi and AEj. Inasmuch as step 3260 is implemented with conventional, and simple symbolic expression processing, I will omit all details here. Consequently, through the above described processing, the address difference for the memory references is obtained.

Next, decision step 3262 is executed to determine whether difference diff is a constant. If this difference is a constant, execution proceeds, via the true path emanating from this decision step, to decision step 3264. Alternatively, if difference diff is not a constant, then this difference is not processed further by steps 3264 to 3268 and execution proceeds, via the false path emanating from decision step 3262, to step 3272. Execution of step 3272 sets distance d equal to the current difference value diff, with execution thereafter proceeding to final step 3270 signifying completion of distance calculation step 3218.

Decision step 3264, when executed, determines whether an absolute value, abs, of the difference diff is smaller than distance d. If the absolute value is smaller in that regard, then decision step 3264 routes execution, via its true path, to step 3266, wherein, when executed, the absolute value of difference diff is set as the new value for distance d. Alternatively, if decision step 3264 determines that the absolute value exceeds or equals distance d, then this decision step routes execution, via its false path, directly to step 3268, and hence, back to step 3256, thereby skipping step 3266.

Based on the above processing, difference d is set to be a minimum value of the distance in memory between the memory references of statement Sj and all memory references in cache reference group CAG(m). However, when this distance is not a constant, distance d remains set, through step 3272, as the expression which shows the distance between two memory references in this group.

When the distance d is an expression, the size relationship between d and Dmax is unclear. Hence, by using the value of the distance d set in step 3218, the result of the comparison (d$\leq$Dmax?) undertaken by decision step 3220 in FIGS. 9A and 9B becomes false. As such, the memory references of statement Sj are not mapped into the same cache block as are the memory references in cache reference group CAG (m).

This concludes my explanation of cache reference group analysis step 32. With the above described processing, cache reference group information 9900, encompassing all the cache reference groups, is generated.

Next, I will explain, in detail, the processing inherent in cache conflict graph analysis step 34 shown in FIG. 8.

Figure 11:
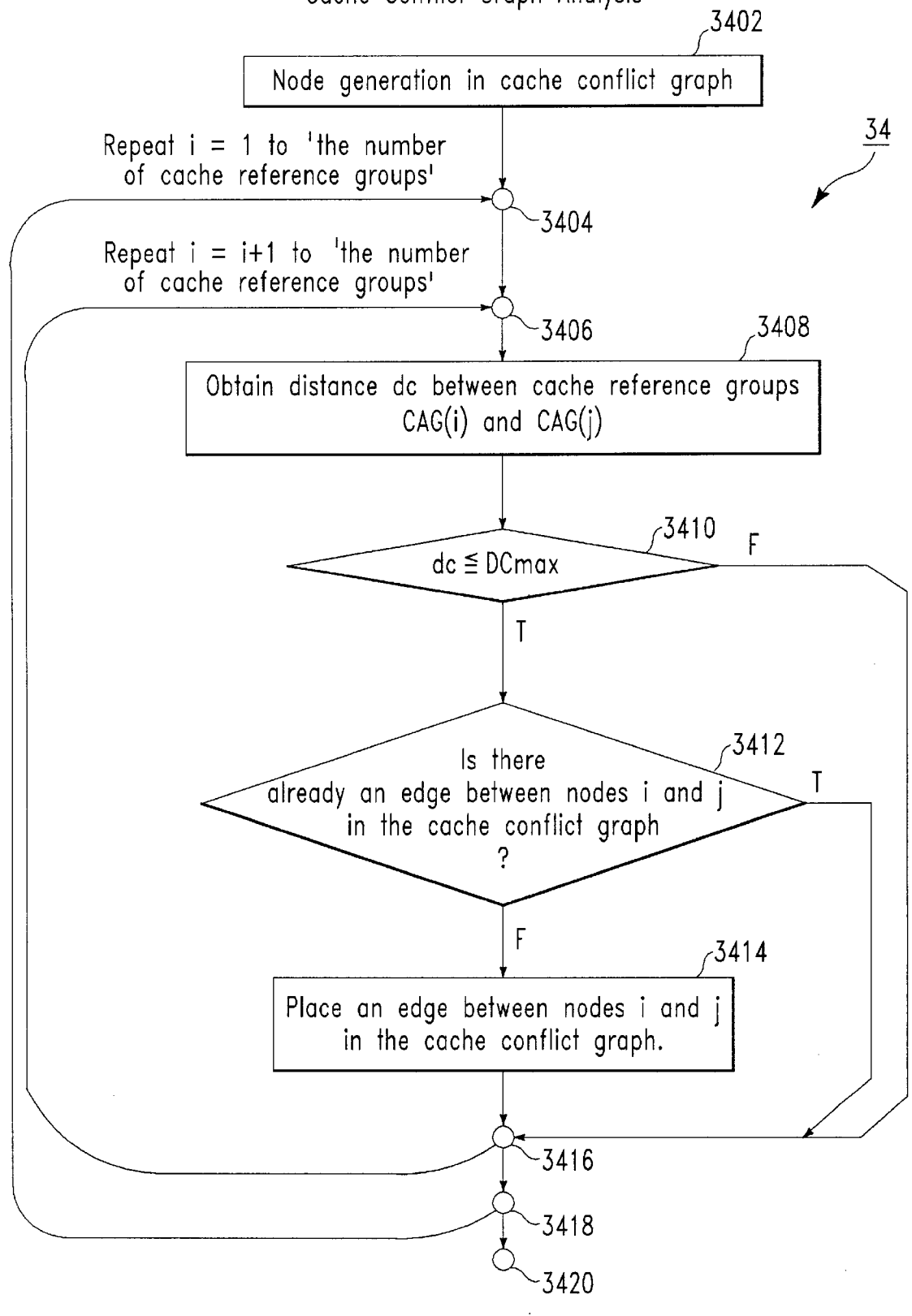
FIG. 11 is a detailed flowchart of cache conflict graph analysis step 34 shown in FIG. 8.

FIG. 11 shows a detailed flowchart of cache conflict graph analysis step 34. This step generates cache conflict graph 9500 based on cache reference group information 9900 (both of which are shown in FIG. 17).

As shown in FIG. 11, upon entry into step 34, step 3402 is executed to generate the nodes of cache conflict graph 9500. A node is made for each cache reference group; the cache reference group number, such as number 9020, of each cache reference group, such as group 9010, is also added by this step.

Thereafter, through repetitive execution of steps 3404 to 3418, the edges (lines) between these newly created nodes are established. These edges are set between the cache reference groups, e.g. group 9010, that have been determined, in the manner described above, as generating cache conflict. In particular, steps 3404 to 3418 are repeated for each value of i, incrementing by one from 1 to "the number of cache reference groups". Steps 3406 to 3416 are also repeated, but for each value of i, incrementing by one from i+1 to "the number of cache reference groups".

Specifically, through execution of step 3408, distance dc within cache 110 (see FIG. 29) and between cache reference groups CAG(i) and CAG(j) is determined. The method for obtaining distance dc will be explained, in detail, below with reference to FIG. 12.

Thereafter, decision step 3410 shown in FIG. 11, when executed, determines whether distance dc is less than or equal to designated value DCmax. If this inequality is satisfied, decision step 3410 routes execution, via its true path, onward to decision step 3412. Alternatively, if distance dc exceeds value DCmax, then steps 3412 and 3414 are skipped, with decision block 3410 routing execution, via its false path, to step 3416.

Designated value DCmax is a threshold value for determining whether or not cache conflict is generated based on the distance between memory references in cache. Suitable values for DCmax are from 0 to "cache block length". Hereafter, I assume DCmax to have the value 4. However, the threshold DCmax value is not limited to those given above and can be any value which determines whether or not cache conflict is generated. Hence, in this preferred embodiment, as described above, a determination is made whether or not memory blocks of memory references in cache reference group CAG(i) and memory references in cache reference group CAG(j) are mapped to the same cache block, in other words, whether or not these memory references cause cache conflict with each other.

Another method that can be alternatively used to determine whether or not memory blocks are mapped to the same cache block involves directly obtaining cache blocks mapped from the position of the reference array elements in main memory. However, in this case, the array element addresses change with loop iterations. Therefore, it is important to take into consideration that mapped cache blocks also change, which, in turn, complicates attendant processing. Nevertheless, this alternate method can be used in the preferred embodiment of my invention.

Now, continuing with the discussion of step 34 shown in FIG. 11, decision step 3412, when executed, determines whether an edge has been established, i.e., already exists, between nodes i and j in cache conflict graph 9500. If such an edge does not yet exist in the graph, then decision step 3412 routes execution, via its false path, to step 3414, which, in turn, sets (places) an edge in the graph between nodes i and j. Execution then loops back, if appropriate, as noted above, via steps 3416 and 3406, to step 3408, and so on. Alternatively, if this particular edge already exists in the graph, then decision step 3412 routes execution, via its true path, directly to step 3416 from which execution loops back, if appropriate and as noted above, to step 3408, and so on; else execution of step 34 terminates at step 3420.

Next, I will explain the processing inherent step 3408 which as described above, determines distance dc on cache 110 between cache reference groups CAG(i) and CAG(j).

Figure 12:
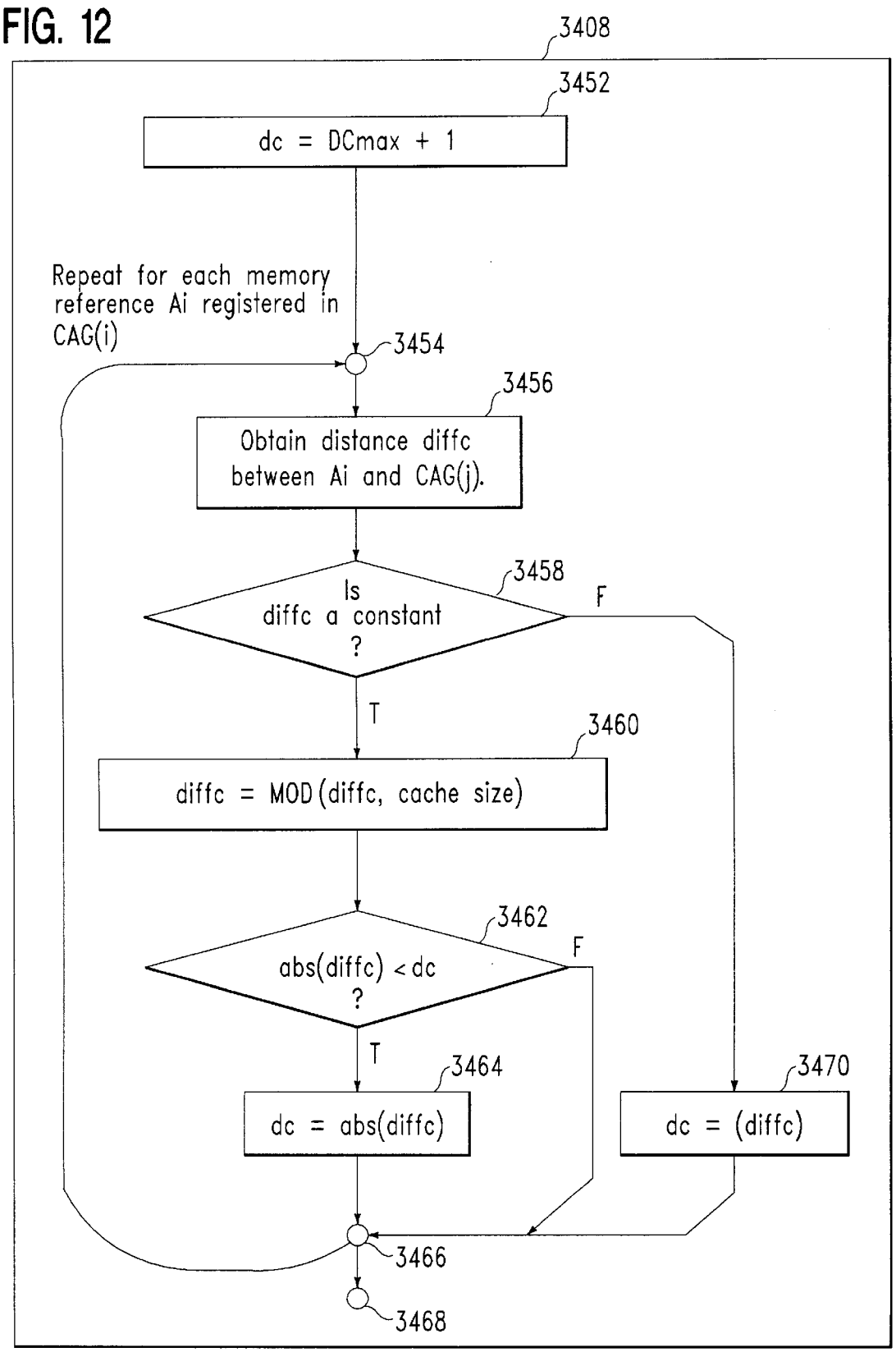
FIG. 12 is a detailed flowchart of distance calculation step 3408 executed within cache conflict graph analysis step 34 shown in FIG. 11.

FIG. 12 shows a detailed flowchart for step 3408. Upon entry into step 3408, execution proceeds to step 3452 which, when executed, sets an initial value for distance dc as equaling DCmax+1. Steps 3454 to 3466 are then repetitively executed for each and every memory reference Ai registered to cache reference group CAG(i).

Through execution of step 3456, distance diffc between memory reference Ai and cache reference group CAG(j) is obtained. Since virtually the same processing is used in this step as is used to implement step 3218, explained above in conjunction with FIG. 10, for the sake of brevity, I will omit any further details of this processing. After step 3456 has fully executed to determine distance diffc, step 3458 is executed to determine whether distance diffc is a constant. If this distance is a constant, then decision step 3458 routes execution, via its true path, onward to step 3460. Alternatively, if distance diffc is not a constant, then decision step 3458 routes execution, via its false path, to step 3470.

Through execution of step 3460, a modulus, i.e., remainder of a quotient, of distance diffc divided by the cache size is calculated, with the distance diffc then being set to a value of the remainder. This calculation provides the distance on cache 110. Next, decision step 3462 is executed to determine whether an absolute value of distance diffc is less than distance dc. If the absolute value is less than the current value of distance dc, then decision step 3462 routes execution, via its true path to step 3464, which sets distance dc equal to this absolute value. Alternatively, if decision step 3462 determines that the absolute value of distance diffc exceeds or equals distance dc, then step 3464 is skipped with execution proceeding, via the false path emanating from this decision block, to step 3466. Step 3470 when executed, sets distance dc equal to the expression for distance diffc. Thereafter, execution loops back, if appropriate and as noted above, via steps 3466 and 3454, to step 3456, and so on; else, execution of step 3408 terminates at step 3468.

Once step 3468 is reached, execution of cache conflict graph analysis step 34 ends, with cache conflict graph 9500 being generated. Hence, as explained above in conjunction with FIG. 8, at this point in the processing, decision step 36 is executed to determine whether an edge, hence indicative of a cache conflict, exists in cache conflict graph 9500.

Figure 18:
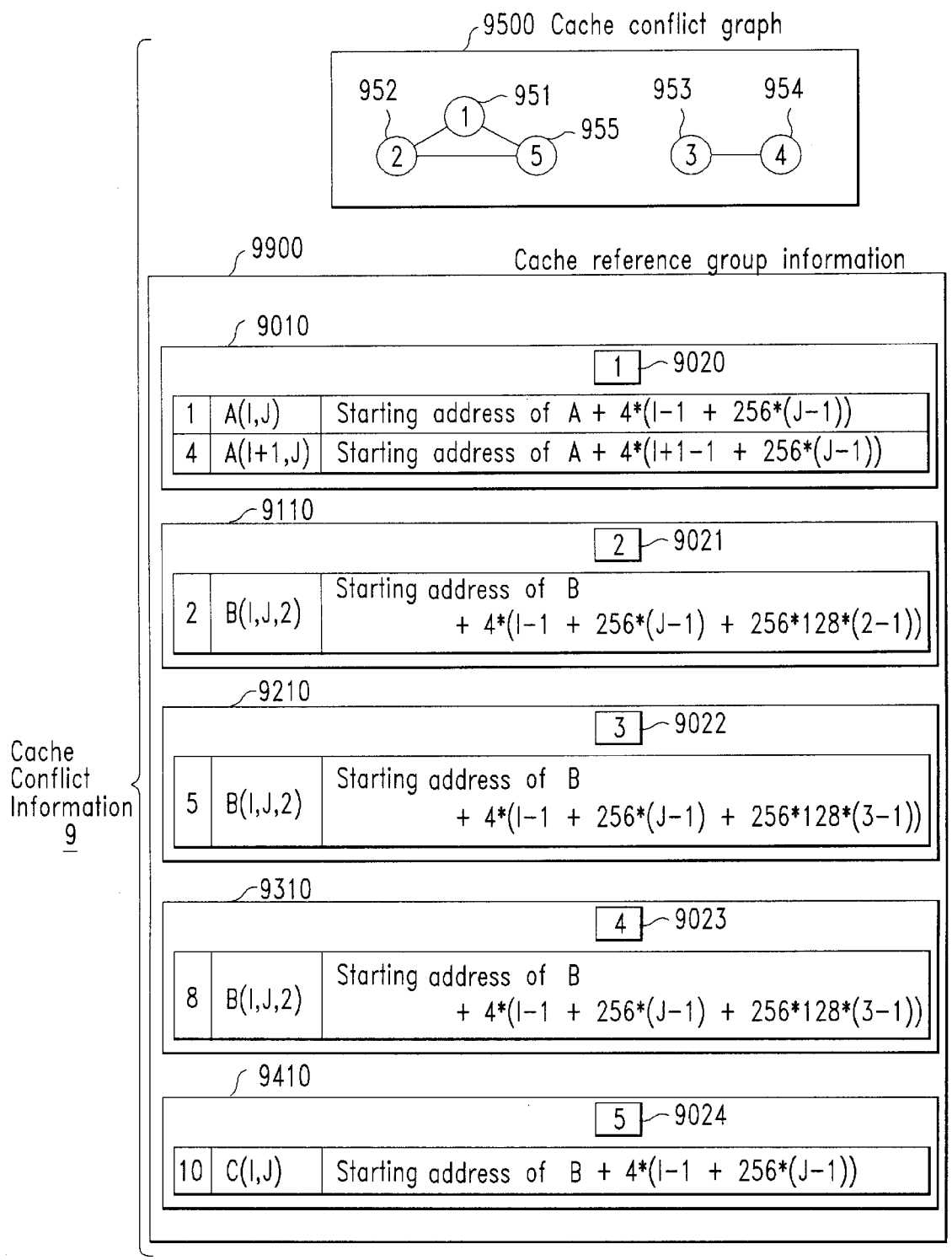
FIG. 18 shows cache conflict information that results from use of my inventive method for exemplary intermediate code 5 for source program 3 shown in FIGS. 16 and 2, respectively.

FIG. 18 shows the contents of cache conflict information 9 after cache conflict analysis process 30 (as shown in FIGS. 8 to 12 and as described above) is performed on intermediate code 5 (discussed above and shown in FIG. 16) of source program 3 shown in FIG. 2. As shown in FIG. 18, cache conflict graph 9500 contains a graph consisting of nodes 951, 952 and 955, and a graph consisting of nodes 953 and 954. Cache reference group information 9900 includes multiple cache reference groups 9010, 9110, 9210, 9310, and 9410, with corresponding cache reference group numbers 9020 to 9024 having been added to the respective cache reference groups.

From cache conflict graph 9500 shown in FIG. 18, cache conflict occurs between cache reference groups 9010, 9110, and 9410 with the cache reference group numbers 1, 2 and 5, respectively. Also, this graph indicates that cache conflict occurs between cache reference groups 9210 and 9310 with the cache reference group numbers 3 and 4, respectively.

Cache reference group 9010 is made from two memory references A(I,J) and A(I+1,J), each of the other reference groups 9110, 9210, 9310, 9410 consists of only one memory reference. The reason that A(I,J) and A(I+1,J) are both in the same cache reference group 9010 is that, for cache reference group analysis step 32 (shown in FIG. 8), the difference between the address calculation expressions for these memory references as given in FIG. 18; namely, "(the starting address of A)+4*(I−1+256*(J−1))" and "(the starting address of A)+4*(I+1−1+256*(J−1))" is −4. Here, the absolute value is less than or equal to Dmax (in this case, as noted earlier, Dmax is taken to be 4).

The reason that an edge exists between nodes 952 and 951 in cache conflict graph 9500 is as follows. In cache conflict graph analysis step 34 (shown in FIG. 8), the difference between respective address calculation expressions, given in FIG. 18, "(the starting address of B)+4*(I−1+256*(J−1)+256*128*(2−1))" and "(the starting address of A)+4*(I−1+256*(J−1))" of memory references B(I,J,2) and A(I,J), respectively, in cache reference groups 9210 and 9010 corresponding to the above node numbers is "4*256*128+ (the starting address of B—the starting address of A)". In comparison, as shown in FIG. 3, for contiguous storage, the starting address for array B is situated 128Kbytes after the starting address of array A, so the above mentioned difference becomes 256Kbytes, the remainder after division by cache size (256Kbytes) is 0, and the absolute value (0 in this case) is clearly less than Dmax (DCmax=4 in this case). Inasmuch as the remaining edges in FIG. 18 are derived in the same similar manner as that for the edge between nodes 951 and 952, for brevity I will omit any such discussion for all the remaining edges in cache conflict graph 9500. Hence, I will not explain other portions of FIG. 18.

As described above, after the cache conflict information is generated, through execution of cache conflict analysis process 30, and cache conflicts have been verified as existing through execution of decision step 40 shown in FIG. 1, memory reference reordering process 50 is then performed. Having fully explained process 30 and decision step 40, I will now explain, in detail, reference reordering process 50. Through execution of process 50, cache conflicts are reduced by changing the order of memory references so that, after re-ordering, all references to a memory block, previously transferred to a cache block, are completed before other memory references to that memory block occur; thus preventing the memory block from being rejected from cache 110.

Figure 13:
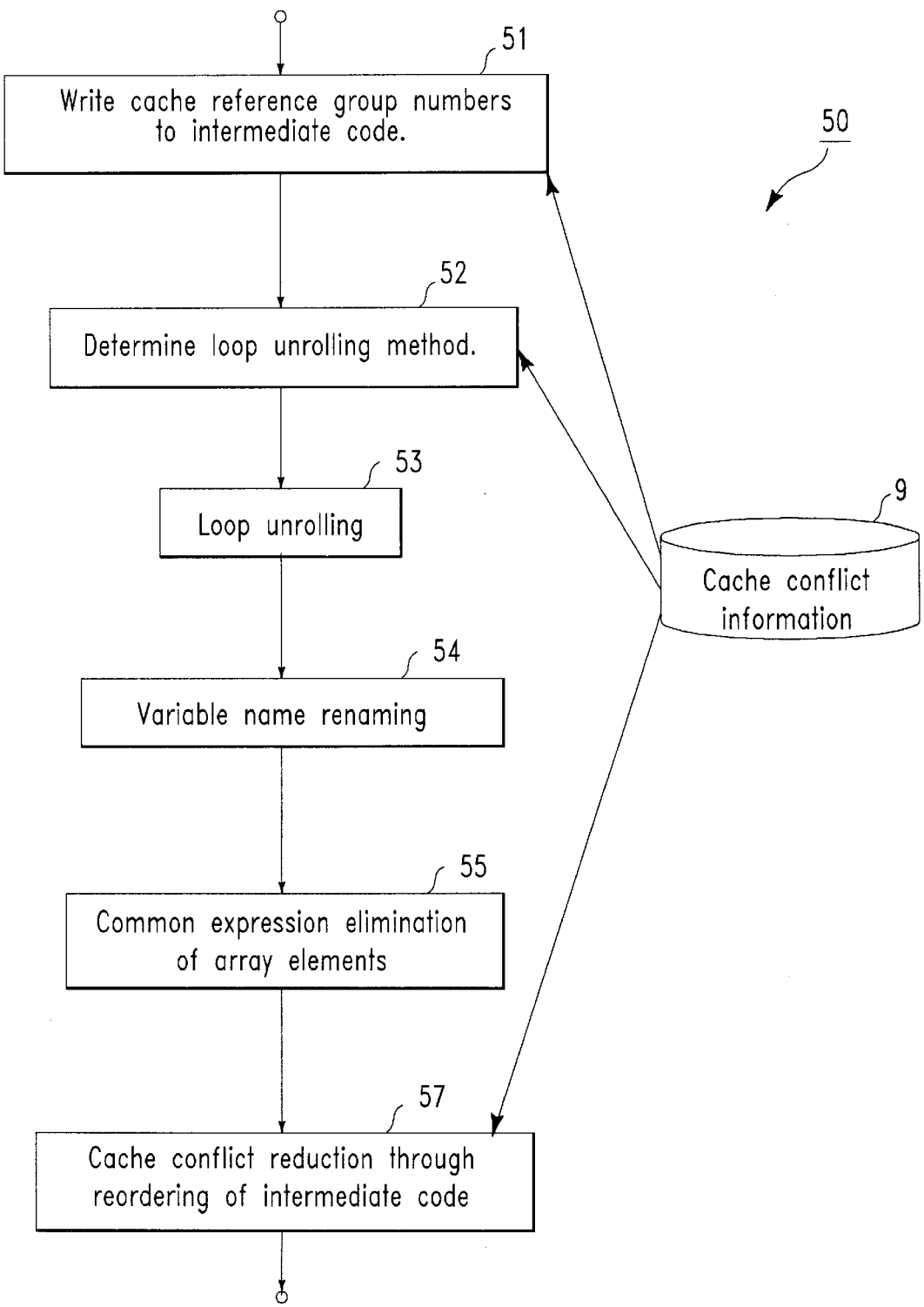
FIG. 13 is a high-level, summarized, flowchart of memory reference reordering process 50 shown in FIG. 1.

FIG. 13 is a high-level flowchart which provides an overview of the processing inherent in memory reference reordering process 50. Upon entry into process 50, execution proceeds to step 51, which, when executed, writes cache reference group numbers, e.g., number 9020, for intermediate code 5 into reference group numbers 330 (see FIG. 19) of memory reference statements but only for those cache reference groups, e.g., group 9010, which cause cache conflicts according to cache conflict information 9. For example, based on the cache conflict information 9 shown in FIG. 18, once intermediate code 5, shown in FIG. 16, has been processed to include the corresponding cache reference group numbers as reference group numbers 330, the resulting intermediate code is shown in FIG. 19.

Returning to FIG. 13, once step 51 has fully executed to fully write all the corresponding cache reference group numbers, step 52 is executed. Step 52, based on cache conflict information 9, determines a particular loop unrolling method which will be performed in a next step, i.e., step 53. Loop unrolling step 53 is performed as part of memory reference reordering process 50 because I anticipate that memory references to the same memory block will occur over multiple loop iterations. Through use of loop unrolling step 53, multiple changes in the order of memory references can be undertaken over multiple loop iterations, so that overall cache reduction process 20, of which reordering process 50 is a part, maximally reduces cache conflicts. Hence, for optimal cache conflict reduction, step 52 is used to determine the optimal loop unrolling method. I will later explain, in detail, how step 52 determines the proper loop unrolling method.

For example, based on cache conflict information 9 shown in FIG. 18, and for intermediate code 5 of FIG. 19, optimal loop unrolling involves unrolling the innermost loop of I four times. In that regard, step 52 determines the parameters of unrolling, i.e., which loop to unroll and the number of times the loop should be unrolled.

Once the optimal loop unrolling method has been determined, execution proceeds to step 53, which, when executed actually unrolls the loop according to these loop parameters. Once the pertinent parameters, such as those set forth in the example immediately above, are determined by step 52, the actual process itself of unrolling a loop is well known. Hence, I will not explain loop unrolling in any further detail.

After step 53 fully is executed, step 54 is executed to process intermediate code 5 which was generated by the loop unrolling step 53. Specifically, through execution of step 54, multiple assignment statements having the same target variable(s) in this code are detected, and if it is possible to rename the variable(s), the variable(s) is renamed. Through step 54, other than when necessary, the target variables of assignment statements are changed so as to be different from each other. Doing so increases the freedom to change the order of the intermediate code, and allows for more optimal reordering to be subsequently undertaken. Conversely, if an assignment statement for the same variable is unchanged, i.e., left as is, these assignment statements can not be reordered with respect to each other, thereby increasing the difficulty through which the intermediate code can be reordered. Since the variable renaming process performed by step 54 is also well known, I will not explain it in any further detail here.

For example, if the loop unrolling step 53 and variable renaming step 54 are executed on intermediate code 5 shown in FIG. 19, resulting intermediate code 5 as shown in FIGS. 20A and 20B is obtained; for which the correct orientation of the drawing sheets for these figures is shown in FIG. 20. As explained above, given the determination of the loop unrolling method, i.e., the pertinent parameters therefor, determined in step 52 of illustratively, unrolling the innermost loop of I four times, then, as shown in FIGS. 20A and 20B, the innermost loop has been unrolled by 4 times for I. Where possible, variables, existing in code 5 shown in FIG. 19, have been renamed in the code shown in FIGS. 20A and 20B.

After variable renaming is completed, execution proceeds to step 55 as shown in FIG. 13, which, when executed, eliminates references to the same array elements in intermediate code 5 as this code then exists. As a result, redundant memory references are eliminated. Since the elimination process undertaken by step 55 is also widely known, for brevity I will omit any further explanation of it.

For example, when the elimination of common array elements is performed through execution step 55 on intermediate code 5 shown in FIGS. 20A and 20B, intermediate code 5 such as that shown in FIGS. 21A and 21B is obtained; the correct orientation of the drawing sheets for FIGS. 21A and 21B is shown in FIG. 21. For the illustrative intermediate code shown in FIGS. 20A and 20B, statements 11, 21 and 31 as identified by statement number 305, have all been eliminated thereby yielding intermediate code 5 shown in FIGS. 21A and 21B. Whenever loop unrolling is performed, several redundant array references are generated as shown in FIGS. 20A and 20B, thereby necessitating the elimination of these references through step 55.

Finally, as shown in FIG. 13, step 57 is executed. Based on reference group numbers 330 written to cache conflict information 9 and as well to intermediate code 5, the intermediate code, that resulted from execution of step 55, such as that shown in FIGS. 21A and 21B, is reordered through step 57 to reduce cache conflicts. Specifically, the order of memory references is changed so that, after re-ordering, all references to a memory block, previously transferred to a cache block, are completed before other memory references occur to that memory block; thus preventing the memory block from being rejected from cache 110.

I have now explained, in an overview summary fashion, the processing inherent in memory reference reordering process 50.

Though I have shown and described the best implementation for the preferred embodiment of my invention, I realize that memory reference reordering process 50 includes many processing steps. Nevertheless, some degree of cache conflict reduction could be achieved, if in lieu of using my entire implementation of process 50, i.e., using loop unrolling method determination step 52 and loop unrolling step 53, variable renaming step 54 and common memory array element elimination step 55, only one or a sub-set of these steps were to be used instead.

For example, if source program 3 were to be provided with its innermost loop having been sufficiently unrolled, then acceptable performance would result even if either loop unrolling method determination step 52 or loop unrolling step 53 was not performed. Conversely, for source programs which are provided with absolutely no loop unrolling, then these steps are essential and must be performed. Hence, as will be plainly evident to one skilled in the art, many such partial embodiments of my inventive method can be devised and implemented, but for brevity I will not describe them in any further detail here.

Inasmuch as intermediate code 5 experiences a variety of successive changes as the code progresses from loop unrolling step 52 through common array element elimination step 55 as shown, e.g., in FIG. 13, then, prior to realigning the intermediate code in step 57, one can alternatively re-execute cache conflict analysis process 30 (see FIG. 1), including step 51 (see FIG. 13) in which cache reference group numbers, e.g., number 9010, are written to intermediate code 5, just prior to executing step 57. Since the effectiveness of cache conflict reduction process 20 does not markedly change, i.e., increase by much, I see no need to explain this alternate technique in any further detail.

Now, returning to memory reference reordering process 50 shown in FIG. 13, I will now describe, in detail, both loop unrolling method determination step 52 and intermediate code reordering step 57. First, I will explain the loop unrolling method determination step 52.

Figure 14:
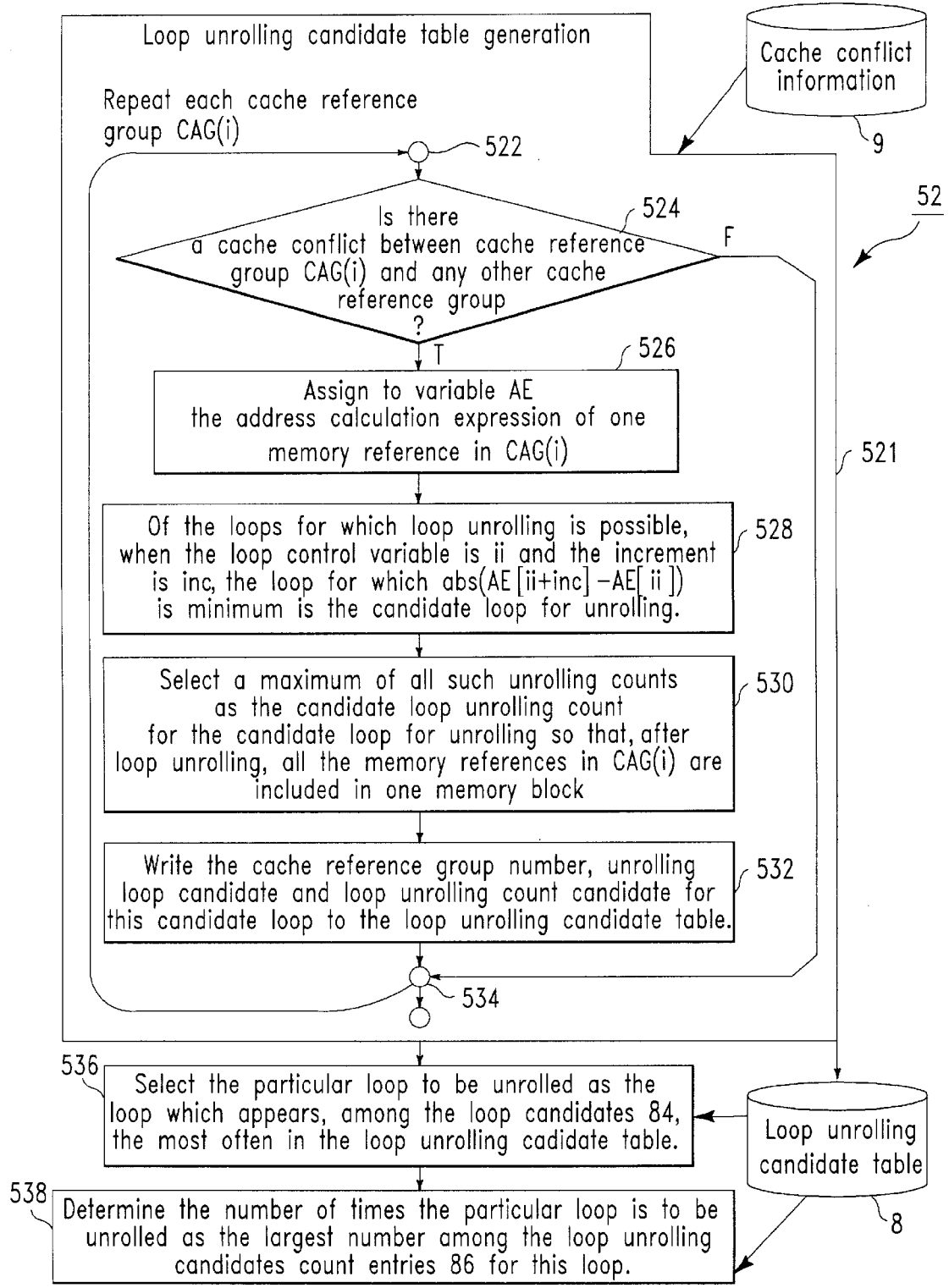
FIG. 14 is a detailed flowchart of loop unrolling method determination step 52 shown in FIG. 13.

FIG. 14 is a detailed flowchart showing the loop unrolling method determination step 52 shown in FIG. 13.

First, upon entry into step 52 as shown in FIG. 14, step 521 is executed which, using cache conflict information 9, generates loop unrolling candidate table 8. This table, when fabricated, contains all loop unrolling candidates from which the loop(s) that is ultimately unrolled is selected.

FIG. 22A shows the structure of loop unrolling candidate table 8. In this table, for each separate cache reference group, such as group 9010 shown in FIG. 18, that causes a cache conflict, the table maintains a separate entry containing a cache reference group number, 82 shown in FIG. 22A, a suitable unrolling loop candidate 84, and a loop unrolling count candidate 86. After loop unrolling candidate table 8 is generated through execution of step 521, thereafter step 536, as shown in FIG. 14, is executed to extract the entry for the candidate loop to be unrolled which appears most often in this table. The loop specified in this entry becomes the loop that is selected to be unrolled. Thereafter, step 538 is executed to extract the largest value of the unrolling count candidate 86 entries stored for the selected loop; this largest value becomes the loop unrolling count, i.e., the number of times this selected loop is to be unrolled.

From the above, the optimal loop unrolling method, i.e., the loop unrolling parameters, is determined for cache conflict reduction process 20.

With the above in mind, I will now proceed to explain, in detail, loop unrolling candidate table generation step 521. During execution of loop unrolling candidate table generation step 521, steps 522 to 534 are separately repeated for each different cache reference group CAG(i).

Specifically, upon entry into step 521, execution proceeds, via repeat step 522, to decision step 524. Using cache conflict information 9, decision step 524 determines whether cache conflict exists between cache reference group CAG(i) and any other cache reference group, e.g., group 9010. If such a cache conflict exists, then decision step 524 routes execution, via its true path, to step 526. Alternatively, if no such cache conflict exists, then steps 526 through 532 are skipped, with decision step 524 routing execution, via its false path, to repeat step 534, to assess cache conflict for the next cache reference group CAG(i+1), or if all such groups have been processed, proceed to step 536.

Through execution of step 526, one memory reference in cache reference group CAG(i) is selected, with the address calculation expression 9090 (see FIG. 17) therefor being assigned to variable AE. Next, step 528 is executed to determine the unrolling loop candidate entry 84. Specifically, for the possible loops to be unrolled, the stride for each loop is determined. For any loop, the stride represents a distance, in memory addresses and in absolute value terms, between a memory reference in one iteration of the loop, i.e., at address AE(ii), and the same reference in the next iteration of that loop, i.e., at address AE(ii+inc), with variable inc defining an increment of the loop from loop iteration ii. The loop having the lowest stride for the one memory reference in CAG(i) is selected as a candidate loop to be unrolled for cache reference group CAG(i).

Next, step 530, which when executed, selects the candidate loop unrolling count, i.e., the number of times a loop is to be unrolled, for the candidate loop selected through step 528 for cache reference group CAG(i). Specifically, the candidate unrolling count is selected, for the candidate loop, as a maximum value of all unrolling counts for that loop such that, after this loop is unrolled, all the memory references in CAG(i) are included within one memory block. Thereafter, step 532 is executed to write an entry for cache reference group CAG(i) into table 8 (see FIG. 22B) containing a cache reference group number 82, and, for this group, the loop to be unrolled for this group, i.e., (optimal) unrolling loop candidate 84, and loop unrolling count 86 therefor.

FIG. 22B shows the loop unrolling candidate table 8 generated through the above-described procedure for cache conflict information 9 shown in FIG. 18. The particular loop "DO 20 I=1, 255" appears most frequently as unrolling loop candidate 84, with the largest loop unrolling count candidate 86 for this loop being "4". Once the loop processing for all the cache reference groups is completed and table 8 is fabricated as shown in FIG. 22B, then, given the illustrative contents of table 8, through execution of steps 536 and 538 shown in FIG. 14, this particular loop is selected as the loop to be unrolled, with its corresponding loop unrolling count stored in table 8 specifying the number of times, i.e., the unrolling count, this loop is to be unrolled.

Next, I will describe, in detail, as part of cache conflict reduction process 50 (see FIG. 1), reordering of intermediate code step 57 (hereinafter, for simplicity, referred to as "intermediate code reordering" step 57) shown in FIG. 13.

Figure 15:
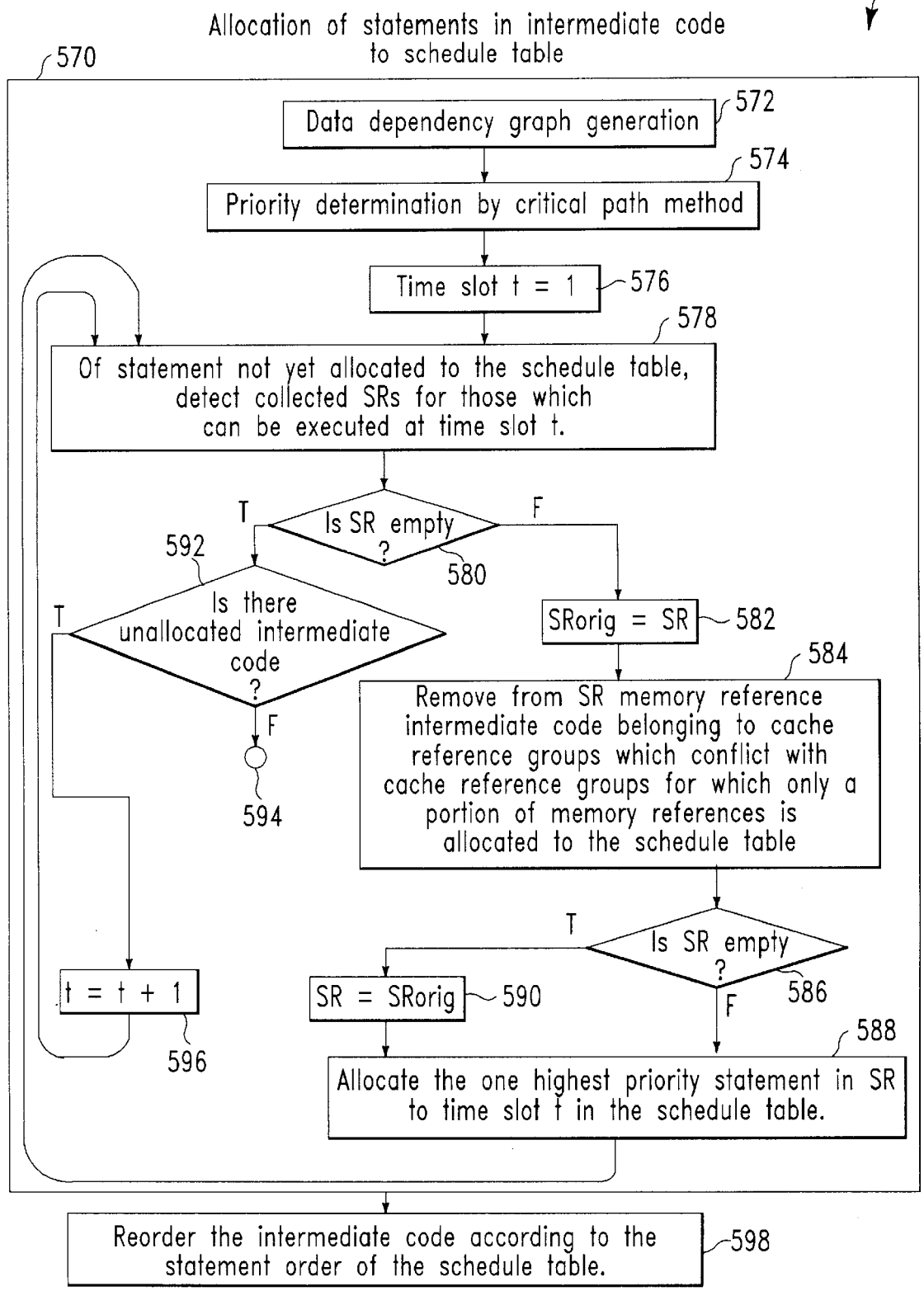
FIG. 15 is a detailed flowchart of cache conflict elimination by intermediate code reordering process 57 shown in FIG. 13.

FIG. 15 is a detailed flowchart of intermediate code reordering step 57. The operations undertaken by step 57 are based on "list rescheduling", which is a conventional process of generally reordering instructions to increase overall program execution speed. List rescheduling is discussed in references, such as ACM SIGPLAN Notices, Vol. 25, No. 7, July 1990, pages 97–106.

Clearly, other methods of reordering instructions other than that specifically used in the preferred embodiment can be employed. However, to reduce cache conflict for a given memory block, the order of memory references must be adjusted before all referencing, to memory blocks previously transferred, to a cache block would have been complete, so that the given memory block will not be rejected from cache. To do this, in this preferred embodiment, selection processing has been added midway through the processing of step 57 in form of scheduling instructions—which, as described below, are provided by step 584. Furthermore, steps 582, 586 and 590 are used, as described below, to ensure proper operation in those instances where memory reference reordering can not be accomplished.

In particular, intermediate code reordering step 57 is formed of two major steps.

First, through execution of step 570 shown in FIG. 15, each statement of intermediate code 5 is allocated to schedule table 26. Schedule table 26 shows execution statements for each time slot of program execution; this table has the format shown in FIGS. 24A and 24B; the correct orientation of the drawing sheets for these figures being shown in FIG. 24. Each line in this table is composed of time slot value 303, statement number 305, three address statement 320 and reference group number 330. When multiple statements are executed in one time slot, schedule 26 is constructed of columns 305, 320 and 330 repeated the appropriate number of times equal to the number of statements so executed in that slot.

Second, after step 570 has allocated each statement of intermediate code 5 to schedule table 26, step 598 is executed to reorder intermediate code 5 according to the order within schedule table 26.

Given that overview of step 57, I will explain, in detail, the processing inherent in step 570 to allocate each statement of intermediate code 5 to the schedule table.

In particular, upon entry into step 570, execution proceeds to step 572 which, when executed, generates data dependency graph 24 for intermediate code 5 as it then exists. FIG. 23 shows illustrative data dependence graph 24 for intermediate code 5 shown in FIGS. 21A and 21B. This particular graph depicts the execution order inter-relationships for the statements in intermediate code 5. Once this graph is constructed through step 572, step 574, shown in FIG. 15, is executed to prioritize, through a critical path method, the nodes in data graph 24.

Graph 24 shows the execution order inter-relationships between each statement of intermediate code 5 represented as a node, and an arc(s) connecting each such node to those which need to precede or follow that node, i.e., the corresponding statements, in the execution order. Additional data has been added to each node and arc. For example, for any statement represented by a node, a number on the left side in a field of a node, e.g., node 242, is statement number 305 for the statement corresponding to that node, and the statement on the right side is the corresponding three address statement 320. The numbers added to the right of each node are the priority and reference group number 330, when the statement is executed. However, reference group number 330 is only added to statements that include memory references that cause cache conflict.

As an example, arc 244 represents that the statement of node 242 must be executed before the statement of node 246 is executed. The numbers added to the arc show the duration of execution of the preceding statement, such as "2" in the case of the arc connecting these two nodes. Priority through the critical path method is determined by a duration of the longest path from each node to a final node.

After step 574, shown in FIG. 15, has fully executed to determine priority for all the arcs in the graph, step 576 is executed to initialize variable t, which specifies the current time slot, to 1. Thereafter, step 578 is executed, which, for statements that have not yet been allocated to the schedule table, detects a set of memory reference statements (SRs) which can be executed in time slot t. However, a statement that is able to execute at time slot t means that all immediately preceding statements, having been allocated to the schedule table, must have completed their execution before time slot t.

Next, execution proceeds to decision step 580. This step determines whether or not the set of SRs produced by step 578 is empty. If this set of SRs is empty, i.e., no statements are seen as being executable in time slot t, then decision step 580 routes execution, via its true path, to decision step 592. Alternatively, if this set of SRs is not empty, decision step 580 routes execution, via its false path, to step 582 which, in turn, saves the current contents of this set to set SRorig.

Once step 582 has executed, execution proceeds to step 584. The latter step removes from the set of SRs the intermediate code for memory reference statements that belong to cache reference groups which conflict with other cache reference groups and for which only a portion of those statements is allocated to the schedule table. Through step 584, the order of memory references is controlled, i.e., specifically re-ordered, to reduce cache conflict before all referencing to a memory block previously transferred to a cache block would have been completed, so that the memory block is not rejected from cache.

Specifically, through step 584, allocation of the memory reference statements, that have been removed from the set of SRs, to the schedule table has not been stopped, but rather, just delayed. In particular, each memory reference statement that has been removed from the set of SRs is allocated to the schedule table after all other statements in the cache reference groups have been allocated, the latter statements including statements which would cause cache conflict with the removed statement and those statements in the cache group that have been allocated to the scheduling table.

After step 584 completes its execution, execution proceeds to step 586 which determines whether or not the set of SRs is empty. If the set of SRs is empty, i.e., all its statements have been allocated to the schedule table, then decision step 586 routes execution, via its true path, to step 590. Otherwise, if the set of SRs is not empty, then decision step 586 routes execution, via its false path, to step 588. Thus, one can see that step 586 effectively determines whether there are no statements which can be executed at time slot t other than memory reference statements which cause cache conflict. In other words, when the set of SRs is empty, there are no statements which can be executed at time slot t other than memory references which cause cache conflict, hence execution proceeds forward to step 590. Alternatively, when the set of SRs is not empty, there are statements which can be executed at time slot t which do not cause cache conflict, thus effectively directing execution forward to step 588.

As noted above, step 590 is executed when there are no statements which can be executed at time slot t other than memory references which cause cache conflict. When executed, step 590 resets the set of SRs to select a statement to be allocated to time slot t from among the memory reference statements which cause cache conflict. In other words, the set of SRs is reset to the contents of set SRorig, which is the contents of the set of SRs at the point this set was first fabricated through execution of step 578. In this case, cache conflict is always generated, but as described above, the only statements which can be executed at this time, i.e., time slot t, are memory reference statements. Since it is rare to only have statements which cause cache conflict, this situation poses no great problem.

Alternatively, when such conflicting memory reference statements potentially executable at time slot t remain, then one can cease statement allocation at time slot t, increase the time slot value, t, by 1, and continue processing downward from step 578 in an attempt to allocate statements, including the conflicting memory reference statements, at time slot t+1. However, with this approach, unless one were to fix, i.e., limit, the number of time slots which are allowed to remain empty, i.e., have nothing allocated to them, processing may continue indefinitely. In view of the above caveat, this alternate approach can certainly be used within my inventive method, and particularly with step 570.

In any event, step 588, when executed, allocates one of the highest priority statements in the set of SRs to the time slot t portion of the schedule table. Once this occurs, execution loops back to step 578. In particular, when step 588 is executed immediately after step 586, then of the statements, which can be executed at time slot t, those that do not cause cache conflict and which have the highest priority are allocated to the schedule table. Alternatively, when step 588 is executed immediately after step 590, then statements which cause cache conflict can be allocated to the schedule table, but only those statements having the highest priority are selected. There are various existing conventional methods for selecting one of many statements that has the highest priority which can be used in implementing step 588. Since the particular method chosen is not particularly relevant to my present invention, I will omit any details of these methods herein.

Eventually, decision block 580 routes execution, over its true path, to decision step 592. Step 592, when executed, determines whether there are statements which have not yet been allocated to the schedule table. If such statements remain to be allocated, then decision step 592 routes execution, via its true path, to step 596, which increments the current time slot value, t, by one. Thereafter, execution loops back to step 578 where processing is repeated for these statements. Alternatively, if all the statements in the intermediate code have been allocated, i.e., no unallocated statements remain, then processing of step 570 ends, with decision block 592 routing execution, via its false path, to point 594, and from there to step 598, which has been described above.

FIGS. 24A and 24B collectively show an illustrative schedule table 26 to which statements have been allocated by the above-described procedure and in accordance with data dependency graph 24 shown in FIG. 23, the correct orientation of the drawing sheets for FIGS. 24A and 24B is shown in FIG. 24. As one can now see, memory reference statements for the intermediate code and belonging to cache conflict groups, e.g., group 9010, with cache reference group numbers 1 (stored within cache reference group number field 9020 shown in FIG. 18), 2 and 5 which would otherwise cause cache conflict with each other, as illustrated in FIGS. 21A and 21B, through processing provided by, e.g., step 584, are now sequentially lined up without being mixed together. Cache conflict groups 9010 with cache reference group numbers (9020) 3 and 4 are the same. From this, memory blocks are prevented from being rejected by cache, before all referencing to memory blocks previously transferred to a cache block, would otherwise have been completed.

FIGS. 25A and 25B collectively show intermediate code 5 after it has been reordered according to schedule table 26 shown in FIGS. 24A and 24B. In other words, intermediate code 5 shown in FIGS. 25A and 25B is intermediate code which resulted from use of cache conflict reduction process 20, shown in FIG. 1. After cache conflict reduction process 20, code generation process 60 of compiler 1 is performed on the intermediate code shown in FIGS. 25A and 25B to generate object program 7, generally shown in FIG. 1 and specifically shown collectively in FIGS. 26A and 26B; the proper orientation of the drawing sheets for FIGS. 26A and 26B, is depicted in FIG. 26.

FIG. 27 shows the cache conflict for object program 7 shown in FIGS. 26A and 26B. As explained previously, FIG. 7 shows corresponding cache conflict when my inventive cache conflict reduction process 20 is not used on the same source program. As is clearly evident in FIG. 27, one can see that, in contrast to that shown in FIG. 7, there are absolutely no cache misses caused by cache conflicts.

I will now discuss the quantitative effects of this preferred embodiment. With computers currently available on the market, instruction execution time normally consumes one cycle per instruction, but when a cache miss occurs, such execution time can consume approximately 10 such instruction cycles. For the following discussion and for simplicity, I will estimate execution times using these values.

First, from the cache conflict generation conditions shown in FIG. 7, when object program 5 shown in FIG. 6 was executed, without having previously performed my inventive cache conflict reduction method, an execution time of 4 loop cycles is obtained. For each of 4 iterations through the single loop, 6 cache misses are generated. Given my assumption of 10 cycles for each cache miss, and since the number of instructions for which a cache miss was not generated is 7, the total instruction execution time for the program shown in FIG. 6 is 4*(6*10 cycles+7 cycles)=268 cycles.

In contrast, from the cache conflict generation conditions shown in FIG. 27, i.e., for object program 5 of FIGS. 26A and 26B which results from performing my inventive cache conflict reduction process on the same source program as that which resulted in the object code shown in FIG. 6, given the same number of loop cycles, i.e., 4, the total execution time is the number of cache misses, here 6, multiplied by 10 cycles/miss plus time needed to execute the remaining instructions which did not generate a cache miss, i.e., 33 cycles. The resulting execution time is 6*10+33=93 cycles. Therefore, through use of my inventive cache conflict reduction process, the execution time, for the same source code, decreased from 268 to 93 cycles. In other words, execution time, as measured in cycles, decreased by a factor of 93/268 which equals an increase in execution speed of approximately 2.9 times.

Furthermore, by using the preferred embodiment to reorder the memory references in program intermediate code 5 through execution of memory reference reordering process 50, any extra dependency caused by allocating a few registers to the memory reference instructions does not occur. Hence, use of my inventive method provides increased freedom to reorder memory references. Consequently, memory references can be readily transferred to optimal positions with a concomitant improvement in the amount of cache conflict reduction that results.

Further, with my preferred embodiment, memory reference reordering process 50 was described as being executed on program intermediate code 5. However, process 50 can also be executed on object program 7. In the latter case, instruction reordering for all instructions, including those which were not expected to be generated at the intermediate code stage, can be performed, which will likely produce an increasingly precise reordering.

Additionally, memory reference reordering process 50 can also be executed on both program intermediate code 5 and object program 7. Since this case simultaneously provides all the advantages set forth in the preceding two paragraphs, optimal cache conflict reduction can be achieved.

Moreover, memory reference reordering process 50 can be executed on program intermediate code 5, with the resulting intermediate code being reverse compiled (reconverted) to a corresponding source program, with this source program then being externally disseminated for use on computers other than that which generated this source program. Hence, through this approach, other compilers can also use the advantageous effects of cache conflict reduction process 20 which will have been incorporated into the source program, thereby enhancing the general use of cache conflict reduction process 20.

I have shown and described the preferred embodiment of my inventive method, in the context of illustrative use with direct map method cache. However, those skilled in the art will realize that my inventive method is not limited to only direct map method cache, but rather can be used with other forms of cache, such as set associative method cache.

Through use of my invention, programs, which would otherwise exhibit a large decrease in performance due to cache conflicts, can generate fewer cache conflicts. As a result, program execution speed can be increased. My invention is very useful when compiling programs, operating on computers, which have direct map method cache.

Clearly, it should now be quite evident to those skilled in the art, that while my invention was shown and described, in detail, in the context of a preferred embodiment, and with various modifications thereto, a wide variety of other modifications can be made without departing from the scope of my inventive teachings.

I claim:

1. A compiling method for reducing cache conflicts which would be generated during the execution of a program, wherein the method compiles a source program of the program into an object program for a computer having a main memory and a data cache memory, the method comprising steps of:

a) analyzing syntax of said source program and generating initial intermediate code;

b) extracting memory references from said intermediate code;

c) generating a cache reference group for each group of said memory references that references a common memory block so as to form a plurality of cache reference groups;

d) classifying said cache reference groups and generating cache reference group information;

e) based on said cache reference group information, generating a cache conflict graph which shows the cache conflict conditions among said cache reference groups;

f) providing said cache reference group information and said cache conflict graph as said cache conflict information;

g) based on said cache conflict information, changing an execution order of memory reference codes in said initial intermediate code, so as to form reordered intermediate code which, when compiled into object code and ultimately executed, will generate fewer cache conflicts than would said initial intermediate code, if said initial intermediate code were to be compiled into object code and executed; and h) generating an object program from said reordered intermediate code.

2. The method in claim 1 wherein the step (d) comprises the steps of:

determining, in response to whether a distance on said main memory between memory references in said initial intermediate code is less than a designated value, if said memory references refer to a common one of the memory blocks; and registering those of said memory reference, which refer to a common one of the memory blocks, to a common one of the cache reference groups.

3. The method of claim 1 wherein the step (d) further comprises the steps of:

obtaining the memory block which references the positions, in said main memory, of memory references of said intermediate code, and registering those of said memory references, which refer to the common memory block, to a corresponding common cache reference group.

4. The method of claim 1 wherein the step (e) comprises the steps of:

obtaining, for arbitrary first and second ones of the cache reference groups included in said cache reference group information, a minimum distance value in the cache memory between all of the memory references included in the first cache reference group and all of the memory references included in the second cache reference group; and determining, in response to whether said minimum distance is less than the designated value, an occurrence of cache conflict between the memory references of said first cache reference group and the memory references of said second cache reference group.

5. The method claim 1 wherein the step (e), for arbitrary first and second cache reference groups included in said cache reference group information, comprises the steps of:

obtaining a first one of the cache blocks, said first cache block being mapped from positions in said main memory of all of the memory references that are included in said first cache reference group;

obtaining a second one of the cache blocks, said second cache block being mapped from positions in said main memory of all of the memory references that are included in said second cache reference group; and determining, in response to whether ones of the memory reference are mapped to a same one of the cache blocks, existence of cache conflict between the memory references of said first cache reference group and the memory references of said second cache reference group.

6. A compiling method for reducing cache conflicts which would be generated during the execution of a program, wherein the method compiles a source program of the program into an object program for a computer having a main memory and a data cache memory, the method comprising steps of:

a) analyzing syntax of said source program and generating initial intermediate code;

b) detecting data cache conflicts which would be generated by memory reference codes included in said initial intermediate code and providing conditions for memory reference codes to generate cache conflicts as cache conflict information;

c) based on said cache conflict information, changing an execution order of memory reference codes in said initial intermediate code, so as to form reordered intermediate code which, when compiled into object code and ultimately executed, will generate fewer cache conflicts than would said initial intermediate code, if said initial intermediate code were to be compiled into object code and executed;

d) selecting the loop from one of a plurality of loops in said initial intermediate codes so as to identify a selected loop;

e) determining a number of times the selected loop is to be unrolled, such that a length of each memory reference that results once the selected loop is unrolled equals a block length of one of the cache blocks, and unrolling the selected loop said number of times; and f) changing the order of said memory reference code in said intermediate code after the selected loop, which provides repetitive processing in said initial intermediate code, is unrolled.

* * * * *